United States Patent
Amemiya et al.

(10) Patent No.: US 9,185,137 B2
(45) Date of Patent: Nov. 10, 2015

(54) METHOD OF CONTENT DELIVERY, INFORMATION PROCESSING DEVICE, AND INFORMATION PROCESSING SYSTEM

(71) Applicant: FUJITSU LIMITED, Kawasaki-shi, Kanagawa (JP)

(72) Inventors: Kouichirou Amemiya, Kawasaki (JP); Kenichi Abiru, Sagamihara (JP); Hitoshi Ueno, Kawasaki (JP); Kazumine Matoba, Shinjuku (JP)

(73) Assignee: FUJITSU LIMITED, Kawasaki (JP)

( * ) Notice: Subject to any disclaimer, the term of this patent is extended or adjusted under 35 U.S.C. 154(b) by 235 days.

(21) Appl. No.: 13/849,648

(22) Filed: Mar. 25, 2013

(65) Prior Publication Data
US 2013/0332502 A1    Dec. 12, 2013

(30) Foreign Application Priority Data
Jun. 6, 2012  (JP) ................. 2012-128848

(51) Int. Cl.
G06F 15/16     (2006.01)
H04L 29/06     (2006.01)
H04L 29/08     (2006.01)
H04N 21/262    (2011.01)
H04N 21/2668   (2011.01)
H04N 21/414    (2011.01)

(52) U.S. Cl.
CPC ............ *H04L 65/10* (2013.01); *H04L 65/4084* (2013.01); *H04L 67/325* (2013.01); *H04L 67/327* (2013.01); *H04N 21/2625* (2013.01); *H04N 21/2668* (2013.01); *H04N 21/41415* (2013.01)

(58) Field of Classification Search
USPC ......... 709/201, 203, 217, 219, 223, 224, 226, 709/229
See application file for complete search history.

(56) References Cited

U.S. PATENT DOCUMENTS

| | | | |
|---|---|---|---|
| 7,853,969 B2* | 12/2010 | Smith et al. | 725/22 |
| 2004/0107169 A1* | 6/2004 | Lowe | 705/59 |
| 2006/0116965 A1* | 6/2006 | Kudo et al. | 705/52 |
| 2006/0230305 A1* | 10/2006 | Smith et al. | 714/4 |
| 2008/0244037 A1* | 10/2008 | Okuda | 709/217 |

FOREIGN PATENT DOCUMENTS

| | | |
|---|---|---|
| JP | 2004-310593 | 11/2004 |
| JP | 2008-252735 | 10/2008 |
| JP | 2009-100057 | 5/2009 |

OTHER PUBLICATIONS

Kazumine Matoba et al., "Service Oriented Network Architecture for Scalable M2M and Sensor Network Services", Intelligence in Next Generation Networks (ICIN), 2011 15th International Conference on Intelligence in Next Generation Network Services on Oct. 4-7, 2011, pp. 35-40.

* cited by examiner

Primary Examiner — Quang N Nguyen
(74) Attorney, Agent, or Firm — Staas & Halsey LLP

(57) ABSTRACT

A method of content delivery executed by a computer is provided. The computer specifies an identifier of a content associated with an user identifier, an identifier of a device at a delivery destination of the content, and time until data of the content is delivered to the device at the delivery destination, when event data including the user identifier read by a sensor is received. The computer calculates, from the specified time, a clock time to start content sending to the device at the delivery destination of the content or a clock time to start data sending to a device that carries out the content sending, and stores these data, and sends the stored data to the device of the delivery destination, at a clock time that is stored in the data storage unit.

10 Claims, 30 Drawing Sheets

FIG. 1

| UID | DETECTED LOCATION (src) | DISPOSITION DESTINATION (dst) | EVENT INTERVAL |
|---|---|---|---|
| 001 | A TICKET GATE | A VENDING MACHINE TICKET GATE | 10 SEC |
| | B TICKET GATE | B VENDING MACHINE TICKET GATE | 10 SEC |
| 002 | A TICKET GATE | — | — |
| 003 | A TICKET GATE | B VENDING MACHINE PLATFORM | 10 MIN |
| 004 | A TICKET GATE | A VENDING MACHINE PLATFORM | 1 MIN |
| ⋮ | ⋮ | ⋮ | ⋮ |

FIG. 7

| HEADER | SOURCE ADDRESS |
| --- | --- |
| | DESTINATION ADDRESS |
| EVENT DATA | EVENT OCCURRENCE CLOCK TIME |
| | EVENT OCCURRENCE LOCATION |
| | USER ID |

FIG. 8

| EVENT OCCURRENCE CLOCK TIME | EVENT OCCURRENCE LOCATION | USER ID |
| --- | --- | --- |
| CLOCK TIME WHEN EVENT OCCURS | IDENTIFIER OR ADDRESS | IDENTIFIER OF USER THAT CAUSES EVENT |

FIG. 9

| USER ID | CONTENT ID | CONTENT SIZE | LINK |
|---|---|---|---|
| 001 | COFFEE A | 13 | ftp://C/CoffeeA |
| 002 | COFFEE B | 12 | ftp://C/CoffeeB |
| 003 | COLA | 15 | ftp://C/Cola |
| 004 | GREEN TEA | 17 | ftp://C/GreenTea |
| ⋮ | ⋮ | ⋮ | ⋮ |

FIG. 10

| CONTENT ID | CONTENT DISPOSITION DESTINATION | DELAY TIME |
|---|---|---|
| IDENTIFIER OF CONTENT | IDENTIFIER OR ADDRESS | TIME TAKEN FOR DISPOSITION OF CONTENT TO DISPOSITION DESTINATION |

FIG. 11

| DESTINATION | NETWORK BANDWIDTH |
|---|---|
| IDENTIFIER OR ADDRESS OF DISPOSITION DESTINATION DEVICE OF CONTENT | BANDWIDTH (BYTE/SEC) |

FIG. 12

| DISPOSITION STARTING CLOCK TIME | DISPOSITION DESTINATION ADDRESS | USER ID | CONTENT ID |
|---|---|---|---|
| CLOCK TIME TO START DISPOSITION | ADDRESS OF DISPOSITION DESTINATION DEVICE OF CONTENT | IDENTIFIER OF DISPLAY TARGET USER | IDENTIFIER OF CONTENT TO BE DISPOSED |

FIG. 13

| HEADER | SOURCE ADDRESS |
|        | DESTINATION ADDRESS |
| DATA   | USER ID |
|        | CONTENT |

FIG. 14

| HEADER | SOURCE ADDRESS |
|        | DESTINATION ADDRESS |
| EVENT DATA | EVENT OCCURRENCE CLOCK TIME |
|            | EVENT OCCURRENCE LOCATION |
|            | USER ID |

FIG. 20

UID = 001

| | DESTINATION | | | | | | |
|---|---|---|---|---|---|---|---|
| | STATION A TICKET GATE | STATION A DISPLAY DEVICE 1 | STATION A DISPLAY DEVICE 2 | STATION B TICKET GATE | STATION B DISPLAY DEVICE 1 | STATION B DISPLAY DEVICE 2 | STATION C TICKET GATE |
| SOURCE STATION A TICKET GATE | | 10 | 5 | 1 | 0.01 | 0.01 | 10 |
| STATION A DISPLAY DEVICE 1 | 0.1 | | 0.1 | 0.1 | 0.1 | 0.1 | 0.1 |
| STATION A DISPLAY DEVICE 2 | 0.1 | 0.1 | | 0.1 | 0.1 | 0.1 | 0.1 |
| STATION B TICKET GATE | 1 | 0.01 | 0.01 | | 0.1 | 0.1 | 1 |
| STATION B DISPLAY DEVICE 1 | 0.01 | 0.01 | 0.01 | 0.01 | | 0.01 | 0.01 |
| STATION B DISPLAY DEVICE 2 | 0.01 | 0.01 | 0.01 | 1 | 0.01 | | 0.01 |
| STATION C TICKET GATE | 10 | 0.1 | 0.1 | ... | ... | ... | |
| ... | ... | ... | ... | ... | ... | ... | ... |

FIG. 21

| UID=001 | | DESTINATION | | | | | | |
|---|---|---|---|---|---|---|---|---|
| | | STATION A TICKET GATE | STATION A DISPLAY DEVICE 1 | STATION A DISPLAY DEVICE 2 | STATION B TICKET GATE | STATION B DISPLAY DEVICE 1 | STATION B DISPLAY DEVICE 2 | STATION C TICKET GATE |
| SOURCE | STATION A TICKET GATE | | 20 | 120 | 300 | 320 | 420 | 1200 |
| | STATION A DISPLAY DEVICE 1 | 20 | | 100 | 280 | 300 | 400 | 1180 |
| | STATION A DISPLAY DEVICE 2 | 120 | 100 | | 180 | 200 | 300 | 1080 |
| | STATION B TICKET GATE | 300 | 280 | 180 | | 20 | 120 | 900 |
| | STATION B DISPLAY DEVICE 1 | 320 | 300 | 200 | 20 | | 100 | 880 |
| | STATION B DISPLAY DEVICE 2 | 420 | 400 | 300 | 120 | 100 | | 780 |
| | STATION C TICKET GATE | 1200 | 1180 | 1080 | 900 | 880 | 780 | |
| | ... | ... | ... | ... | ... | ... | ... | ... |

FIG. 25

| HEADER | SOURCE ADDRESS |
| | DESTINATION ADDRESS |
| CONTENT INFORMATION LIST FOR EACH USER | USER ID |
| | CONTENT ID |
| | CONTENT SIZE |
| ⋮ | ⋮ |

FIG. 26

| HEADER | SOURCE ADDRESS |
| | DESTINATION ADDRESS |
| DISPOSITION DELAY DATA LIST | CONTENT ID |
| | CONTENT DISPOSITION DESTINATION |
| | DELAY TIME |

FIG. 27

| UID | DETECTED LOCATION (src) | DISPOSITION DESTINATION (dst) | EVENT INTERVAL |
|---|---|---|---|
| 001 | A TICKET GATE | A VENDING MACHINE TICKET GATE | 10 SEC |
| 002 | A TICKET GATE | — | — |
| 003 | A TICKET GATE | B VENDING MACHINE PLATFORM | 10 MIN |
| 004 | A TICKET GATE | A VENDING MACHINE PLATFORM | 1 MIN |

FIG. 28

| UID | DETECTED LOCATION (src) | DISPOSITION DESTINATION (dst) | EVENT INTERVAL |
|---|---|---|---|
| 001 | B TICKET GATE | B VENDING MACHINE TICKET GATE | 10 SEC |
| 002 | — | — | — |
| 003 | — | — | — |
| 004 | — | — | — |

FIG. 29

| HEADER | SOURCE ADDRESS |
|---|---|
| | DESTINATION ADDRESS |
| EVENT INTERVAL LIST | USER ID |
| | EVENT OCCURRENCE LOCATION |
| | CONTENT DISPOSITION DESTINATION |
| | EVENT INTERVAL |

FIG. 30

| SENDING STARTING CLOCK TIME | SENDING DESTINATION ADDRESS | EVENT DATA | ADDRESS OF CONTENT DISPOSITION DESTINATION DEVICE | CONTENT ID |
|---|---|---|---|---|
| CLOCK TIME TO START SENDING EVENT | ADDRESS OF CONTENT MANAGER | TRIGGER EVENT DATA MAIN BODY | ADDRESS OF DISPLAY DEVICE TO DISPOSE CONTENT FROM CONTENT MANAGER | IDENTIFIER OF CONTENT TO BE DISPOSED |

FIG. 33

| HEADER | SOURCE ADDRESS |
| --- | --- |
|  | DESTINATION ADDRESS |
| EVENT DATA | EVENT OCCURRENCE CLOCK TIME |
|  | EVENT OCCURRENCE LOCATION |
|  | USER ID |
|  | CONTENT DISPOSITION DESTINATION ADDRESS |
|  | CONTENT ID |

METHOD OF CONTENT DELIVERY, INFORMATION PROCESSING DEVICE, AND INFORMATION PROCESSING SYSTEM

CROSS-REFERENCE TO RELATED APPLICATION

This application is based upon and claims the benefit of priority of the prior Japanese Patent Application No. 2012-128848, filed on Jun. 6, 2012, the entire contents of which are incorporated herein by reference.

FIELD

The embodiments discussed herein are related to a method of content delivery, an information processing device, and an information processing system.

BACKGROUND

For example, there is a behavioral targeting advertising system that displays advertisement recommended for individual persons in accordance with a situation at that time, such as preference of a person that is understood from a purchase history and the like and an air temperature.

In such a system, it is sought to deliver a content real-time. For example, in an advertisement display system in a railroad yard, in a case of displaying advertisement on an automatic vending machine, a customer looks at the panel only for several seconds approximately, so that it turns out to finish a series of process, from input of a user identifier (ID) to display of advertisement, in a few seconds (for example, one second through two seconds).

That is, as a user ID is inputted to an automatic vending machine, process of determining a content to be presented to the user and delivering data of the content to the automatic vending machine for display is finished in a few seconds, thereby enabling the user to look at the content.

However, in a case of delivering data of a content utilizing server resources that are put into one distant data center, there is a problem of delivery delay that is derived from communication delay. In general, the throughput between an automatic vending machine with a display that is located in a downtown and a server that is located at a data center is low (approximately several Mbps) and the size of a video content to be delivered is large (several tens of megabits). For example, when the throughput is 10 Mbps and the content size is 60 megabits, it takes six seconds for delivery while a user is often not willing to wait as much as six seconds.

Regarding such a problem related to the time for display, the following techniques are proposed. That is, a center server obtains an event indicating that a user has come near a display device from an entrance and exit system of a building or the like to deliver a content, taking it as a trigger, for that user to a cache server near the display device in advance. This enables to display the content immediately as the user places an IC card or the like over the display device for reading of the user ID.

However, such techniques have a configuration of sending an event from an entrance and exit system directly to a center server, so that as the number of users increases, events focus on the center server and a decrease in the processing speed of the center server sometimes occurs.

Examples of related art may include Japanese Laid-open Patent Publication No. 2008-252735, Japanese Laid-open Patent Publication No. 2004-310593, Japanese Laid-open Patent Publication No. 2009-100057, and Matoba, K.; Abiru, K.; Ishihara, T., "*Service oriented network architecture for scalable M2M and sensor network services*", Intelligence in Next Generation Networks (ICIN), 2011 15th International Conference on 4-7, Oct. 2011, pp. 35-40.

SUMMARY

According to an aspect of the invention, a method of content delivery executed by a computer is provided. The method includes specifying an identifier of a content associated with an user identifier, an identifier of a device at a delivery destination of the content, and time until data of the content is delivered to the device at the delivery destination, when event data including the user identifier read by a sensor is received, calculating, from the specified time, a clock time to start content sending to the device at the delivery destination of the content or a clock time to start data sending to a device that carries out the content sending, storing the specified identifier of the content, the identifier of the device at the delivery destination of the content, and the calculated clock time in a data storage unit in association, and sending, at a clock time that is stored in the data storage unit, data of a content corresponding to the identifier of the content associated with the clock time to the device at the delivery destination of the content corresponding to the identifier of the device at delivery destination of the content associated with the clock time, or sending the identifier of the content associated with the clock time and the identifier of the device at the delivery destination of the content to the device that carries out the content sending.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 1 is a chart illustrating one example of data that is stored in an event interval storage unit;

FIG. 7 is a chart illustrating one example of a message format of a trigger event;

FIG. 8 is a chart illustrating a format example of data that is stored in a trigger event DB;

FIG. 9 is a chart illustrating one example of data that is stored in a content DB;

FIG. 10 is a chart illustrating a format example of data that is stored in a disposition delayed data storage unit;

FIG. 11 is a chart illustrating a format example of data that is stored in a bandwidth data storage unit;

FIG. 12 is a chart illustrating a format example of data that is stored in a pending task storage unit;

FIG. 13 is a chart illustrating a format example of a message for content delivery;

FIG. 14 is a chart illustrating an example of a message format of a content request;

FIG. 20 is a chart illustrating one example of an event correlation table;

FIG. 21 is a chart illustrating a detailed data example of an event interval;

FIG. 25 is a chart illustrating a format example of a message that is sent from a content information distribution unit;

FIG. 26 is a chart illustrating a format example of a message that is sent from a disposition delay data distribution unit;

FIG. 27 is a chart illustrating one example of data that is stored in an event interval storage unit in an event collection and distribution device for Station A;

FIG. 28 is a chart illustrating one example of data that is stored in an event interval storage unit in an event collection and distribution device for Station B;

FIG. 29 is a chart illustrating a format example of a message that is sent from an event interval distribution unit;

FIG. 30 is a chart illustrating a format example of data that is stored in a pending task storage unit according to the second embodiment;

FIG. 33 is a chart illustrating a format example of a message of a trigger event that is sent to the content manager in the second embodiment;

DESCRIPTION OF EMBODIMENTS

First Embodiment

Figure 2:
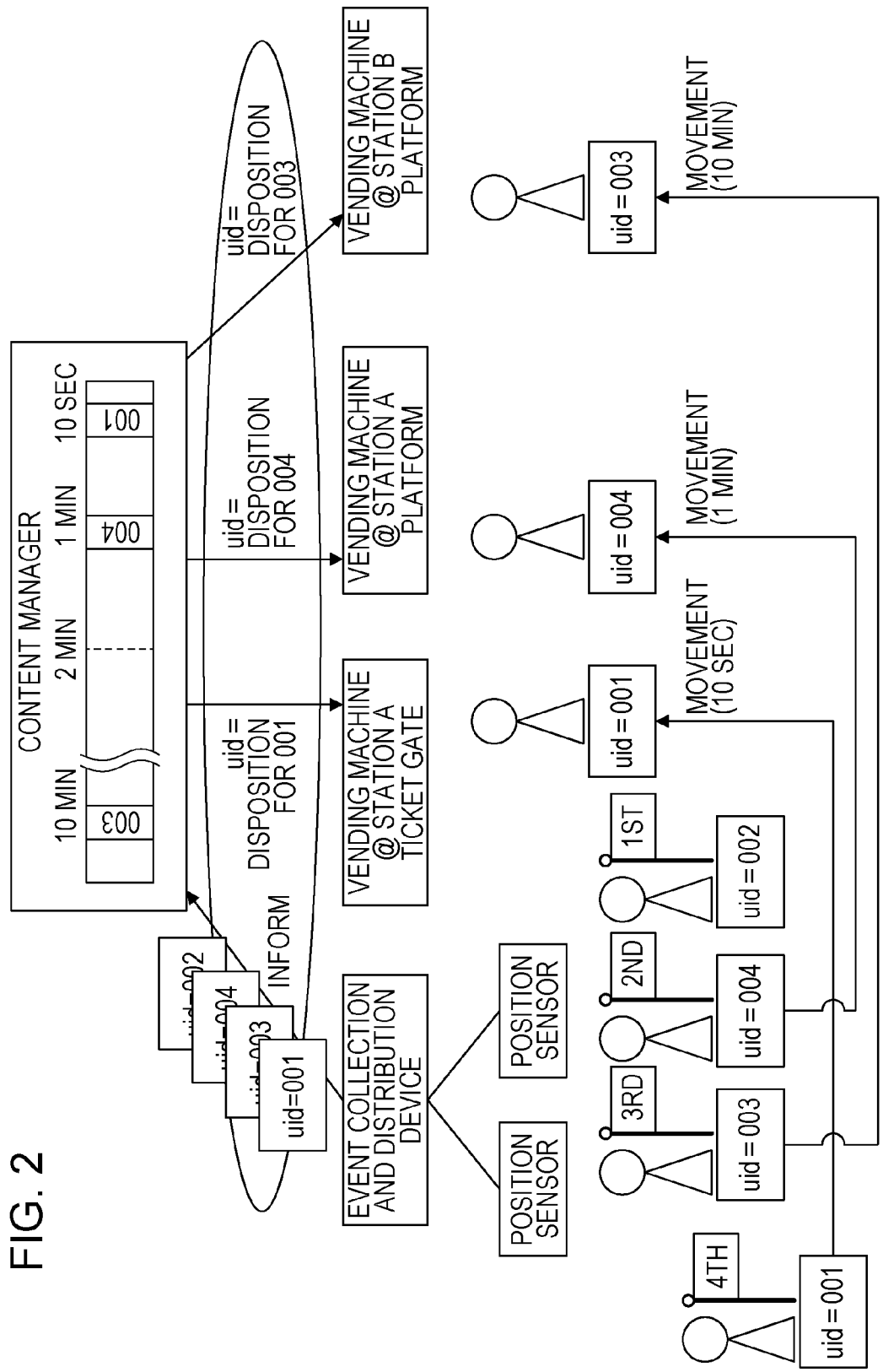
FIG. 2 is a diagram schematically illustrating process of a system according to a first embodiment.

Descriptions are given to an outline of the present embodiment using FIGS. 1 and 2. In the present embodiment, data related to event intervals as illustrated in FIG. 1 is prepared. That is, for each user ID (may also be referred to as a UID), a detected location (src) (in the descriptions below, an identifier of a sensor that is provided at an occurrence location of a trigger event) of the user ID, a disposition destination device (dst) (an identifier of a display device that is provided at an occurrence location of a content request or the like) of a content, and an event interval, which is a time interval between a timing of detecting a user ID and a timing of displaying a content on a display device are associated. In the present embodiment, there is also a case that an address is used as an identifier, and even in a case of specifying an identifier, it is possible to obtain an address from the corresponding relationship between the identifier and the address.

For example, in a case of a user having a user ID of "003", a rule to complete disposition of data of a content, as the user ID is detected at a ticket gate in Station A (referred to as an A ticket gate), at an automatic vending machine on a platform in Station B (referred to as a B vending machine platform) after ten minutes is defined. In contrast, in a case of a user having a user ID of "004", a rule to complete disposition of data of a content, as the user ID is detected at a ticket gate in Station A, at an automatic vending machine on a Station A platform (referred to as an A vending machine platform) after one minute is defined. Such data is set by extracting statistic high probability data from historical data. While it is assumed that there are a plurality of detected locations of a user ID, the detected location does not have to be managed in a situation where there is only one entrance.

In such a manner, when it is possible to obtain the user ID and an ID of the sensor detecting the user ID by preparing a time to complete the disposition of a content in the content disposition destination device in accordance with the user ID and a location of detecting the user ID, it becomes possible to specify a clock time to actually send a content to the disposition destination device considering delay and the like.

In that way, as schematically illustrated in FIG. 2, in a position sensor that is placed at a Station A ticket gate, it is assumed that the user IDs are detected in the order of user ID "002", user ID "004", user ID "003", and user ID "001". In that way, a trigger event including user IDs and sensor IDs are informed in this order via an event collection and distribution device to a content manager. Since the content manager has data as illustrated in FIG. 1, it is understood that data of a disposition destination and an event interval corresponding to the user ID "002" is not set. In such a case, disposition of a content is not carried out for the user ID "002" in the present embodiment. Regarding the user ID "004", since the disposition destination of "an automatic vending machine on the Station A platform" and the event interval of "one minute" are obtained in association with the user ID "004" and the sensor ID at the Station A ticket gate, a content is delivered in such a manner that the content is disposed "at the automatic vending machine on the Station A platform" after one minute after detection of the user ID "004". Regarding the user ID "003", since the disposition destination of "an automatic vending machine on the Station B platform" and the event interval of "ten minutes" are obtained in association with the user ID "003" and the sensor ID at the Station A ticket gate, a content is delivered in such a manner that the content is disposed at "the automatic vending machine on the Station B platform" after ten minutes after detection of the user ID "003". Further, regarding the user ID "001", since the disposition destination of "an automatic vending machine at the Station A ticket gate" and the event interval of "ten seconds" are obtained in association with the user ID "001" and the sensor ID at the Station A ticket gate, a content is delivered in such a manner that the content is disposed at "the automatic vending machine at the Station A ticket gate" after ten seconds after detection of the user ID "001". In the content manager, as schematically illustrated like a queue in FIG. 2, a task of content disposition is scheduled for each user. In this example, content disposition is carried out in the order of content disposition for the user ID "001", content disposition for the user ID "004", and content disposition for the user ID "003". In such a manner, it becomes possible to carry out process of quickly disposing a content that has to be disposed quickly ahead of a content having time to spare for disposition.

In that way, as the user of the user ID "001" moves to arrive at the automatic vending machine at the Station A ticket gate and to have the automatic vending machine read the user ID, the content for the user ID "001" is disposed, so that it becomes possible to display the content without delay. Further, as the user of the user ID "004" moves to arrive at the automatic vending machine the Station A platform and to have the automatic vending machine read the user ID, the content for the user ID "004" is disposed, so that it becomes possible to display the content without delay. In addition, as the user of the user ID "003" arrives at Station B and moves to an automatic vending machine on the Station B platform to have the automatic vending machine read the user ID, the content for the user ID "003" is disposed, so that it becomes possible to display the content without delay.

Figure 3:
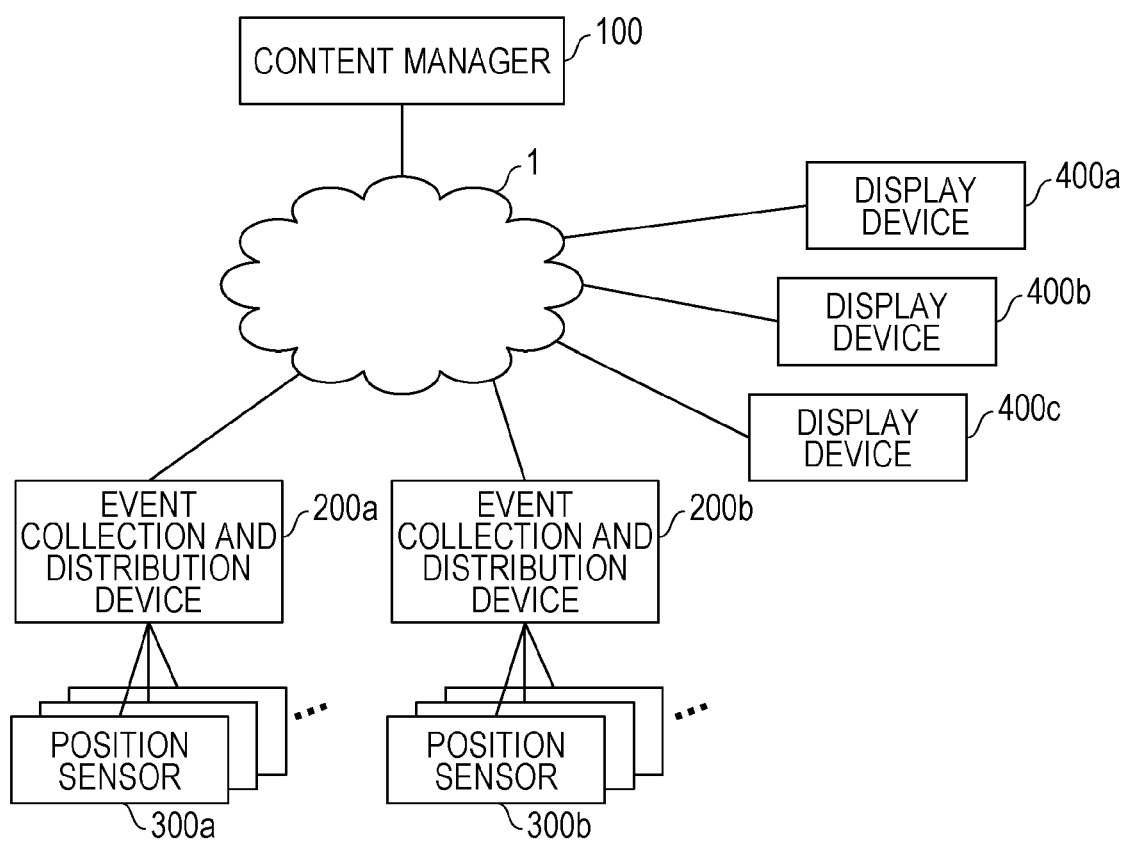
FIG. 3 is a diagram illustrating a system outline according to the first embodiment.

A system configuration example to achieve the process as above is illustrated in FIG. 3. In the present system, a content manager 100 that is placed at, for example, a data center, one or a plurality of event collection and distribution devices 200 (200a and 200b in FIG. 3), and a plurality of display devices 400 (400a through 400c in FIG. 3) are connected via a network 1.

To the event collection and distribution device 200, one or a plurality of position sensors 300a that read a user ID from an integrated circuit (IC) card held by a user are connected. In the present embodiment, the event collection and distribution device 200 sends a trigger event, including a sensor ID and a user ID, that is received from the subordinate position sensors 300a to the content manager 100.

Figure 4:
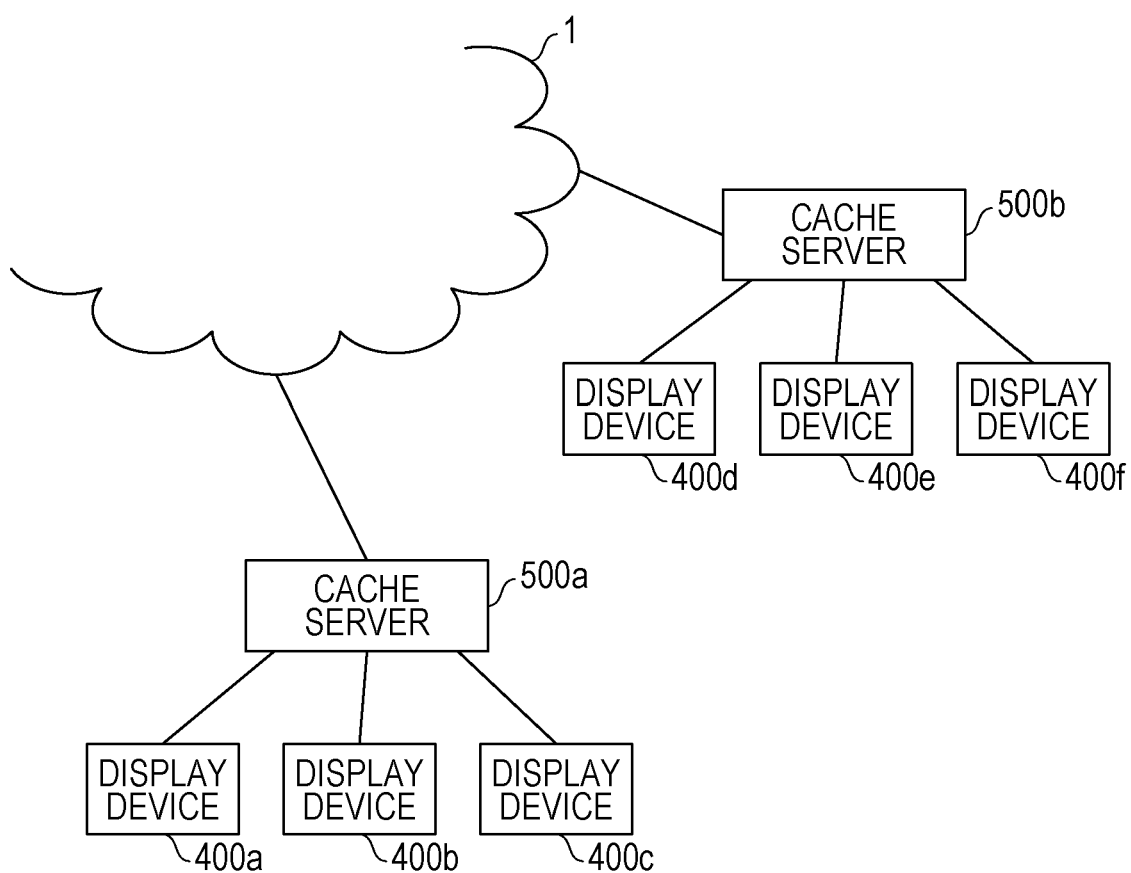
FIG. 4 is a diagram illustrating another example of the system outline according to the first embodiment.

There is not only a case of sending content data directly from the content manager 100 to the display devices 400 but also a case of employing a configuration that is partially illustrated in FIG. 4. That is, one or a plurality of cache servers 500 (500a and 500b in FIG. 4) may also be connected to the network 1 to send content data from the content manager 100 to the cache servers 500. In the example of FIG. 4, the display devices 400a through 400c are connected to the cache server 500a, and display devices 400d through 400f are connected to the cache server 500b. The cache servers 500 are allowed to communicate with the subordinate display devices 400 relatively fast. In this case, the cache server 500 has cache and content data is stored in the cache to send the content data to the display device 400 in accordance with a content request from the subordinate display device 400. There is also a case that the cache server 500 holds data that associates a user ID with a content ID.

Figure 5:
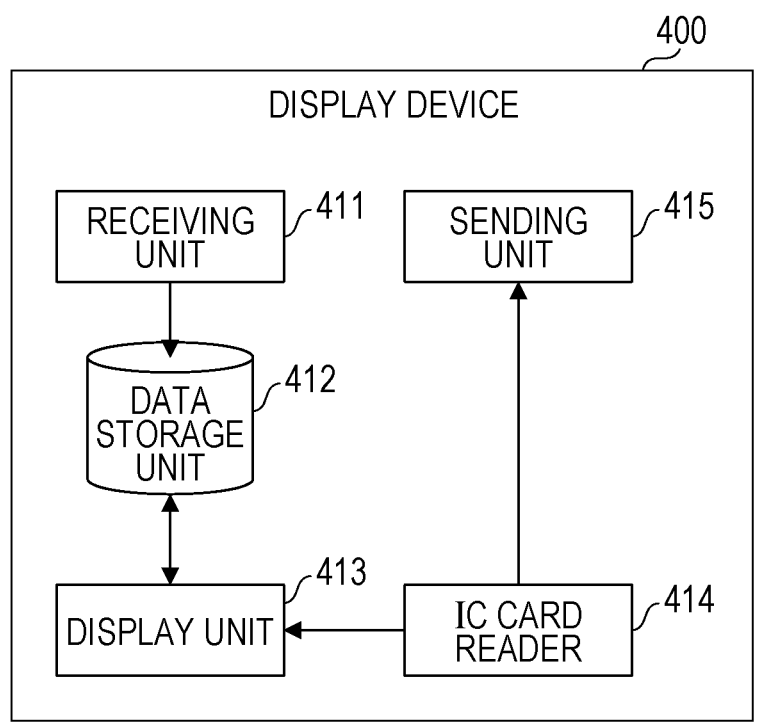
FIG. 5 is a functional block diagram of a display device.

The display devices 400 are automatic vending machines and the like and they have, in addition to basic functions as an automatic vending machine and the like, a receiving unit 411, a data storage unit 412, a display unit 413, an IC card reader 414, and a sending unit 415 as illustrated in FIG. 5. For the IC card reader 414, one that is included in the basic functions as an automatic vending machine and the like may also be utilized directly.

For example, as a user places an IC card over the IC card reader 414 for reading of the user ID, the IC card reader 414 outputs the user ID thus read to the sending unit 415. The sending unit 415 sends a content request including the user ID thus read to the content manager 100. In the present embodiment, such a content request is sent to the content manager 100 in order to be accumulated as fundamental data to generate data on the event intervals illustrated in FIG. 1.

In a case of not using the cache server 500, the IC card reader 414 outputs the user ID thus read to the display unit 413 and the display unit 413 reads out content data that is stored in the data storage unit 412 in association with the user ID thus received to display on a display screen. As the receiving unit 411 receives content data from the content manager 100, it stores the content data in the data storage unit 412.

Further, in a case of using the cache server 500, the sending unit 415 sends a content request including the user ID to the cache server 500 in addition to the content manager 100. As the cache server 500 receives a content request from the subordinate display device 400, it specifies a content that is associated with the user ID included in the content request and reads out content data of the content to send the content data to the display device 400 of the request source. As the receiving unit 411 of the display device 400 receives the content data from the cache server 500, it stores the content data in the data storage unit 412 and the display unit 413 displays the content data that is stored in the data storage unit 412 on the display screen.

Figure 6:
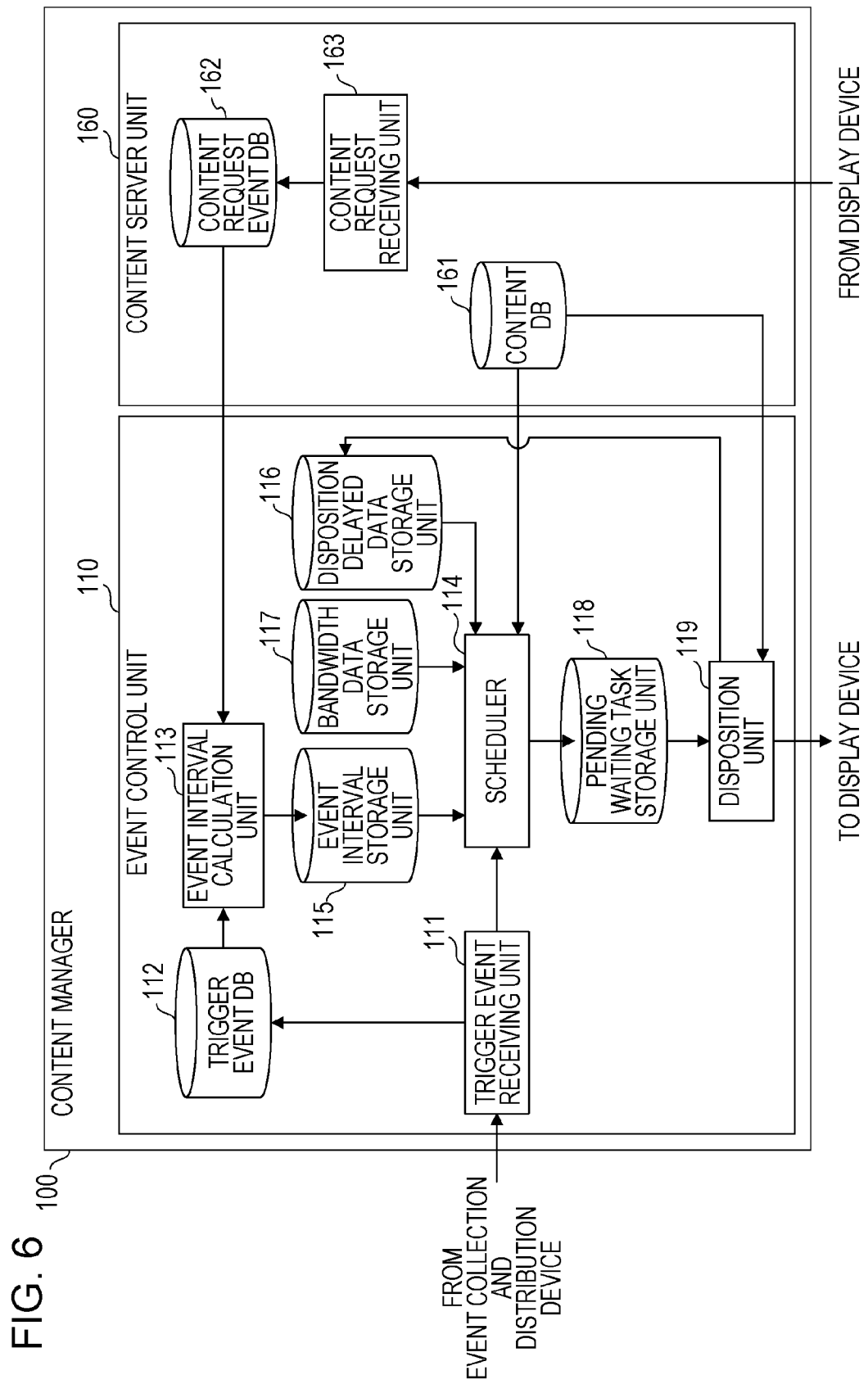
FIG. 6 is a functional block diagram of a content manager according to the first embodiment.
Figure 15:
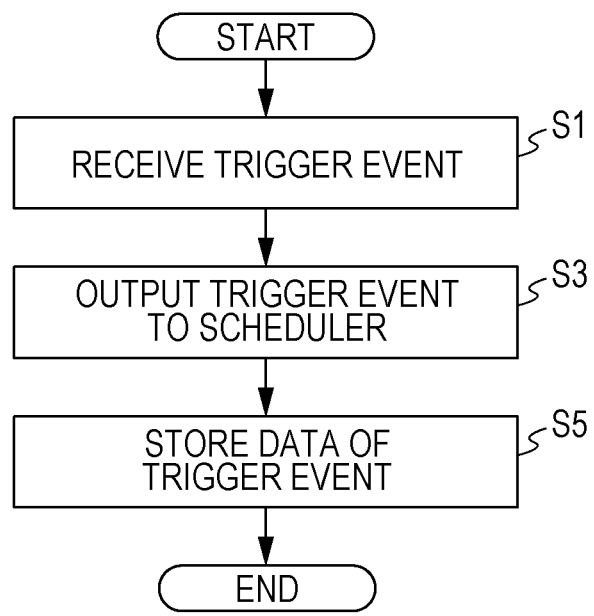
FIG. 15 is a chart illustrating a process flow of a trigger event receiving unit.

Next, FIG. 6 illustrates a configuration example of the content manager 100. The content manager 100 has an event control unit 110 and a content server unit 160.

The event control unit 110 has a trigger event receiving unit 111, a trigger event database (DB) 112, an event interval calculation unit 113, a scheduler 114, an event interval storage unit 115, a disposition delayed data storage unit 116, a bandwidth data storage unit 117, a pending task storage unit 118, and a disposition unit 119.

The content server unit 160 has a content request receiving unit 163, a content DB 161, and a content request event DB 162.

As the trigger event receiving unit 111 receives a trigger event from the event collection and distribution device 200, it stores data of the trigger event in the trigger event DB 112 and outputs the data of the trigger event to the scheduler 114. In the present embodiment, since the event collection and distribution device 200 does not carry out special process, the event collection and distribution device 200 may not be provided.

A trigger event has a message format as illustrated in, for example, FIG. 7. A trigger event includes a header portion and an event data portion. The header portion includes a source address, such as a media access control (MAC) address or an IP address, and a destination address. The event data portion includes an event occurrence clock time (a clock time when a user ID is read), an identifier of an event occurrence location (an identifier of the position sensor 300 that has read the user ID, that is, a sensor ID), and a user ID.

FIG. 8 illustrates a format example of data that is stored in the trigger event DB 112. In the example of FIG. 8, the event occurrence clock time, the identifier or the like of the event occurrence location (a sensor ID, which may also be an address), and the user ID that are included in the trigger event are registered.

The scheduler 114 specifies the content ID that is associated with the user ID using the content DB 161. The scheduler 114 also specifies the identifier or the address of a device at a disposition destination and the event interval that are associated with the user ID and the identifier of the event occurrence location (an identifier of the detected location, a sensor ID) from the event interval storage unit 115. Then, the scheduler 114 generates data of a pending task corresponding to the trigger event using the data that is stored in the disposition delayed data storage unit 116 or the bandwidth data storage unit 117 and stores the data in the pending task storage unit 118.

The content DB 161 stores data as illustrated in, for example, FIG. 9. In the example of FIG. 9, user IDs, content IDs, content sizes, and links for content data are associated with each other. Further, the content data itself is also stored in the content DB 161.

The event interval storage unit 115 stores data as illustrated in FIG. 1.

FIG. 10 illustrates a format example of data that is stored in the disposition delayed data storage unit 116. In the example of FIG. 10, a delay time taken for disposition from the content manager 100 to a disposition destination device of a content is stored for each combination of a content ID and an identifier or an address of the device at the disposition destination of the content.

FIG. 11 illustrates a format example of data that is stored in the bandwidth data storage unit 117. In the example of FIG. 11, an identifier or an address of a disposition destination device of a content and a network bandwidth (for example, Mbps) between the content manager 100 and the disposition destination device of the content are stored. When the delay time as illustrated in FIG. 10 is not prepared, a delay time is calculated using bandwidth data as illustrated in FIG. 11.

FIG. 12 illustrates a format example of data that is stored in the pending task storage unit 118. In the example of FIG. 12, for each trigger event that causes disposition of a content, a disposition starting clock time to start disposition of the content, an address of a disposition destination device of a content, a user ID of a user subjected to display, and an identifier of the content to be disposed are stored.

As it becomes at a clock time that is stored in the pending task storage unit 118, in accordance with data of a task that is associated with the clock time, the disposition unit 119 reads out content data from the content DB 161 and sends the content data to the device at the disposition destination. For example, the data of the content is sent in a message format as illustrated in FIG. 13. In the example of FIG. 13, a message to send the content includes a header portion and a data portion. The header portion includes a source address, such as a media access control (MAC) address or an IP address, and a destination address. The data portion includes the user ID of a user to be a display destination of the content and the content data.

The disposition unit 119 also calculates a delay time from a sending clock time of the content data and a sending clock time of an ACK message that is received from a device at the disposition destination and stores it in the disposition delayed data storage unit 116.

The content request event DB 162 of the content server unit 160 stores data in a data format as illustrated in FIG. 8.

The content request receiving unit 163 receives a content request from the display device 400 and stores data of an event according to the content request in the content request event DB 162.

FIG. 14 illustrates one example of a message format of a content request. A content request includes a header portion and an event data portion. The header portion includes a source address, such as a media access control (MAC) address or an IP address, and a destination address. The event data portion includes an event occurrence clock time (a clock time when a user ID is read), an identifier of an event occurrence location (an identifier of the display device 400 that has read the user ID, that is, a display device ID), and a user ID.

Next, descriptions are given to details of process according to the first embodiment using FIGS. 15 through 22. Firstly, using FIG. 15, process of the trigger event receiving unit 111 of the event control unit 110 is described.

As the trigger event receiving unit 111 receives a trigger event from the event collection and distribution device 200 (step S1), it outputs the trigger event to the scheduler 114 (step S3). The trigger event receiving unit 111 stores data of the trigger event thus received in the trigger event DB 112 (step S5). As also described above, the data of the trigger event is stored in the data format as illustrated in FIG. 8.

Figure 16:
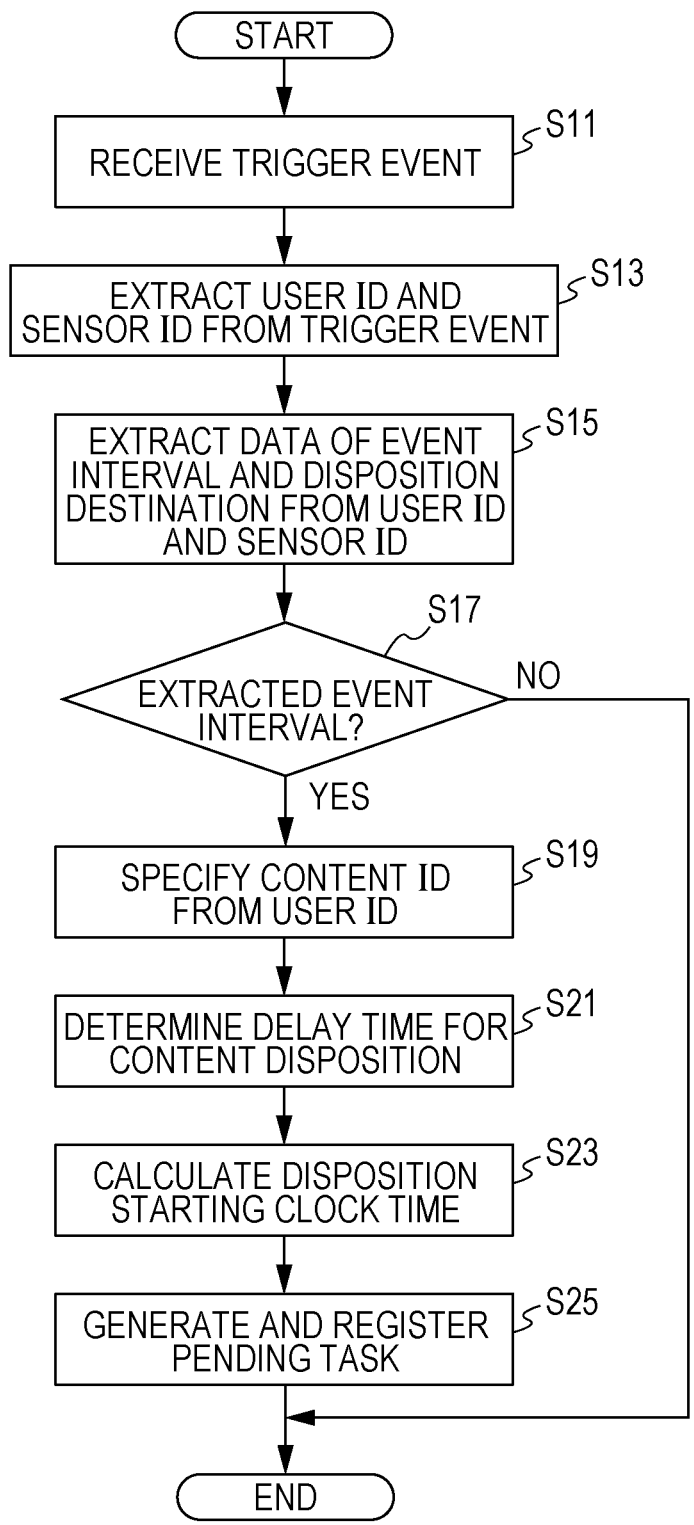
FIG. 16 is a chart illustrating a process flow of a scheduler.

Next, process details of the scheduler 114 are described using FIG. 16. As the scheduler 114 receives the trigger event from the trigger event receiving unit 111 (step S11), it extracts the user ID and the sensor ID at the event occurrence location from the trigger event (step S13). Then, the scheduler 114 extracts the event interval that is associated with the user ID and the sensor ID and the identifier of the disposition destination device of the content from the event interval storage unit 115 (step S15).

There is also a case that data, such as an event interval, is not stored in the event interval storage unit 115 in association with the user ID and the sensor ID that are included in the trigger event. This is a case of a new user and, for example, a user with a user ID that has not been read by the display device 400.

The scheduler 114 judges whether or not the event interval is successfully extracted in step S15 (step S17), and when the event interval is not successfully extracted (step S17: No route), the scheduler 114 terminates the process of the trigger event that is received at this time.

In contrast, when the event interval is successfully extracted (step S17: Yes route), from the content DB 161, the scheduler 114 specifies the content ID and the size that are associated with the user ID extracted from the trigger event (step S19).

Then, the scheduler 114 determines a delay time for content disposition (step S21). When a delay time is associated with a combination of a content ID and an identifier of a disposition destination device of a content in the disposition delayed data storage unit 116 as illustrated in FIG. 10, the delay time is read out. In contrast, when a delay time is not associated with a combination of a content ID and an identifier of a disposition destination device of a content in the disposition delayed data storage unit 116, bandwidth data that is associated with the identifier of the disposition destination device is read out from the bandwidth data storage unit 117 to calculate the delay time by content size/bandwidth data.

Then, the scheduler 114 calculates a disposition starting clock time (step S23). A disposition starting clock time $t_{send}$ is calculated by $t0+[T_{evev}-(t_{now}-t_0)-T_{deploy}]$. $t_0$ denotes an event occurrence clock time that is included in a trigger event, $T_{evev}$ denotes an event interval, $t_{now}$ denotes a current clock time, and $T_{deploy}$ denotes a content disposition clock time. A disposition starting clock time is calculated by deducting $(t_{now}-t_0)$ that is already lost and $T_{deploy}$ that is a time to be lost at the time of delivery from the event interval.

After that, the scheduler 114 generates a pending task that includes a disposition starting clock time, a disposition destination address of a disposition destination device of a content, a user ID, and a content ID and registers them in the pending task storage unit 118 (step S25).

By performing such process, it becomes possible to dispose content data to a display device that is likely to be seen by a user before the user reaches the display device. On that occasion, since priority is set to a task of disposition of content data as a disposition starting clock time in accordance with the length of time until the user moves to the display device that is likely to be seen by a user, it becomes possible to equalize load of the content manager 100 regardless of the order of trigger event occurrence.

Figure 17:
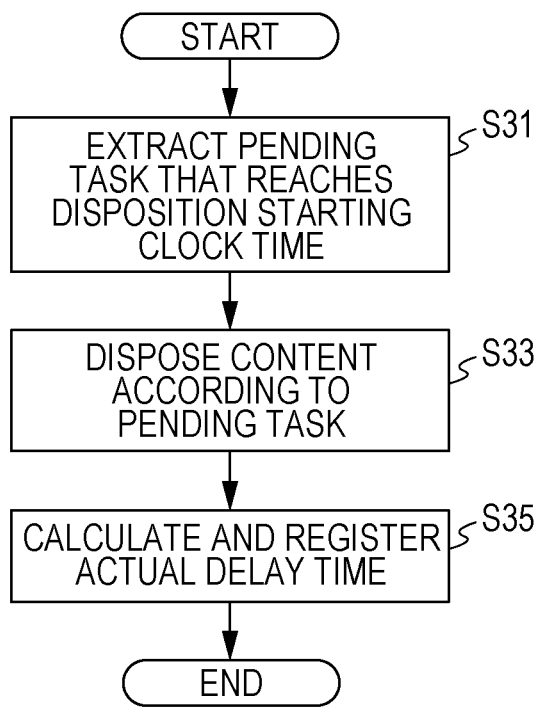
FIG. 17 is a chart illustrating a process flow of a disposition unit.

Next, process details of the disposition unit 119 are described using FIG. 17. The disposition unit 119 extracts a pending task that has the current clock time as a disposition starting clock time from the pending task storage unit 118 (step S31). The disposition unit 119 reads out a content of the content ID that is included in the pending task from the content DB 161 and sends a message including the content data and the user ID as illustrated in FIG. 13 to a disposition destination device address included in the pending task (step S33). On this occasion, the content ID, the disposition destination device address, and the sending clock time are held.

Then, as receiving the ACK message including a receiving clock time of the content from the disposition destination device, the disposition unit 119 calculates an actual delay time by (receiving clock time)−(sending clock time) and stores the actual delay time in the disposition delayed data storage unit 116 in association with the content ID and the disposition destination device address (step S35). The process may also be provisional registration, not regular registration, in order to calculate an average value and the like.

By performing such process, it becomes possible to correct details of the disposition delayed data storage unit 116 in agreement with the actual situation.

Figure 18:
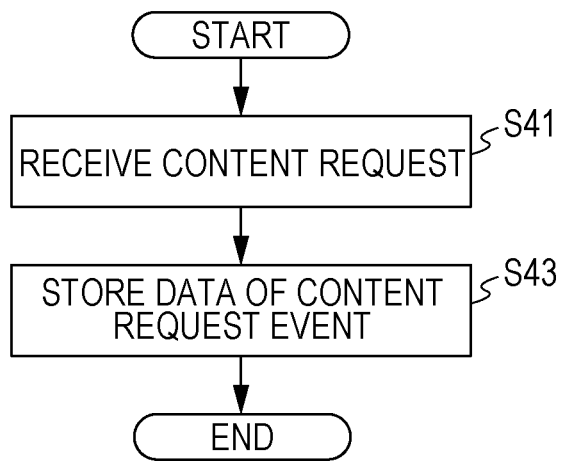
FIG. 18 is a chart illustrating a process flow of a content request receiving unit.

Next, process details of the content request receiving unit 163 are described using FIG. 18. As the content request receiving unit 163 receives the content request (FIG. 14) from the display device 400 (step S41), it stores data of a content request event in the content request event DB 162 based on data that is included in the content request (step S43). The data that is stored in the content request event DB 162 is in a format as illustrated in FIG. 8.

Figure 19:
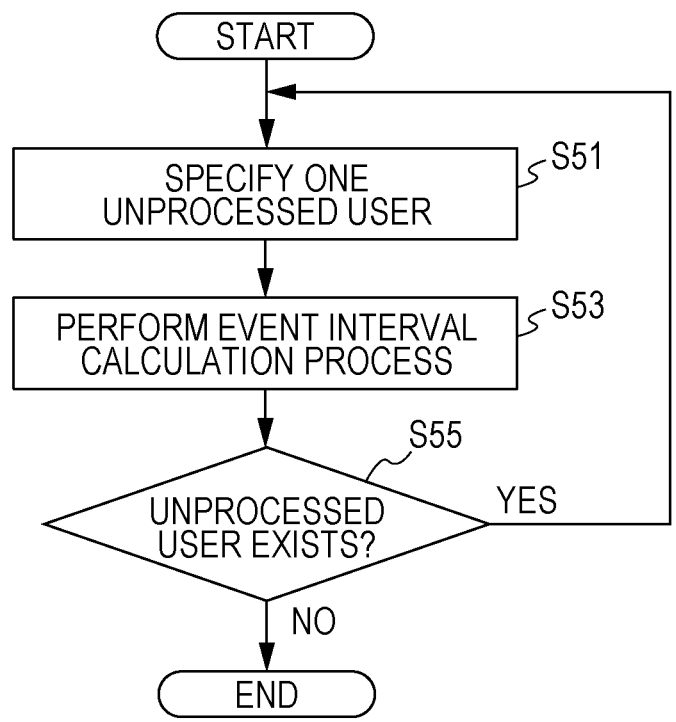
FIG. 19 is a chart illustrating a process flow of an event interval calculation unit.

Next, using FIG. 19, process of the event interval calculation unit 113 that generates data to be stored in the event interval storage unit 115 using the data stored in the trigger event DB 112 and the data stored in the content request event DB 162 is described. The process illustrated in FIG. 19 is performed in a predetermined cycle or at any timing.

Firstly, the event interval calculation unit 113 specifies one unprocessed user out of users that are registered in a user list, for example (step S51). Then, the event interval calculation unit 113 performs event interval calculation process (step S53).

The event interval calculation process varies depending on content delivery targeting. For example, there is a case of putting a further advertisement for a frequent user while there is also a case of placing an advertisement for a user that has utilized several times but does not utilize continuously. In such a manner, a target user and the time to deliver a content when that user reaches which display device 400 are developed, and in accordance with the result, data that is stored in the event interval storage unit 115 is generated. While both are possible to be developed from a behavior history of the user, one example of such chart is as follows. That is, there are actually various calculation methods, and the calculation method is not limited to the following method.

For example, statistic process is applied to data that is stored in the trigger event DB 112 and the content request event DB 162 and also has a data format as illustrated in FIG. 8 to generate an event correlation table as illustrated in FIG. 20 for each user ID. In the example of FIG. 20, rows denote occurrence locations of a trigger event (source) and columns denote occurrence locations of a content request event (destination), and a correlation value is held for a pair of source and destination. In such a manner, the event correlation table is generated in a method of adding a value to a "Station A display device 1" column in a "Station A ticket gate" row when, for example, a trigger event occurs at a Station A ticket gate, and after that, a content request event (same as a purchase event in a case of a vending machine) occurs at a vending machine 1 beside the Station A ticket gate (an automatic vending machine to which the display device 1 belongs).

However, although there is no correlation at all actually, there is a possibility that a content request event at the Station A display device 1 occurs after a while to a trigger event at the Station A ticket gate regarding an identical user ID. In order to avoid reflection on the event correlation table in this case, a travel time of a person is considered. The event interval in a case of actually moving from the Station A ticket gate to the Station A display device 1 for purchase becomes approximately an average value. A large value is added when the event interval calculated from the event data is close to the average value and a smaller value (or 0) is added when the event interval calculated from the event data is further from the average value, thereby avoiding a situation in which the events actually having no correlation are taken as correlated events. Further, data as illustrated in FIG. 21 is held for event intervals for each user by statistic process of event data. In the example of FIG. 21, rows denote occurrence locations of a trigger event (source) and columns denote occurrence locations of a content request event (destination) to hold event intervals for pairs of source and destination.

Above process is process to be performed regardless of targeting. Next, process of setting an advertisement delivery target and generating an event interval for that is carried out. For example, in a case of targeting advertisement delivery to a frequent user, a highly correlated pair of trigger event and content request event is found in the event correlation table for each user. In the case of FIG. 20, the pair of "Station A ticket gate"-"Station A display device 1" is applicable. Based on the data, the event interval of "20" to be used for content delivery is extracted from the detailed data of event intervals in FIG. 21.

Figure 22:
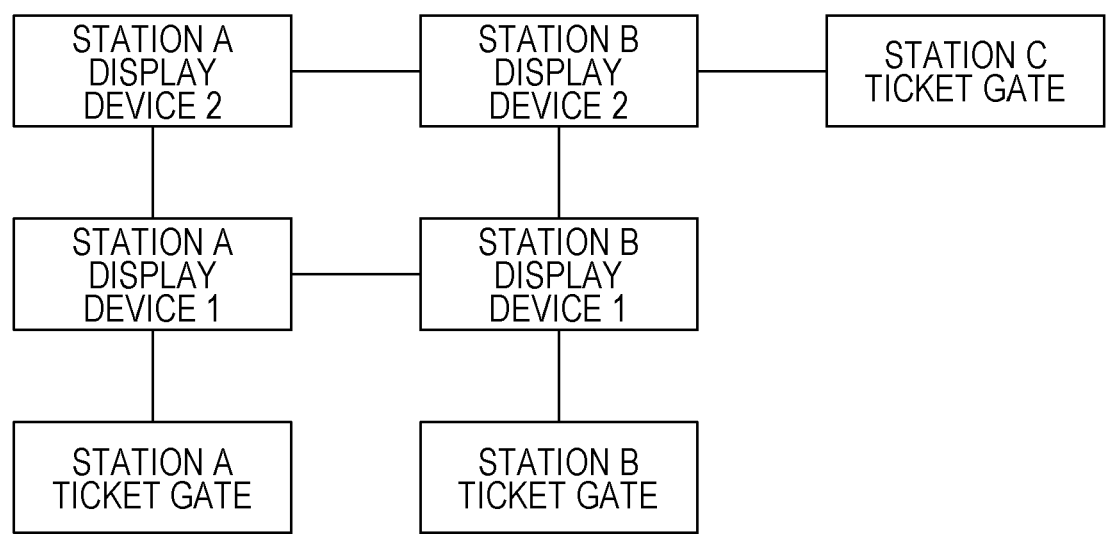
FIG. 22 is a diagram illustrating one example of topology data.

In contrast, in a case of targeting a user that has not purchased much, movement topology data of a person (for example, FIG. 22) is used in addition to the event correlation table illustrated in FIG. 20 and the detailed data of event intervals illustrated in FIG. 21. The topology data in FIG. 22 is such information that a user of the user ID "001" moves, for example, between Station A-Station C while Station B is a transfer station. An event of the user of the user ID "001" in Station B does not occur only by referring to the event correlation table, and only the movement from Station A to Station C (or in the opposite direction) is understood whereas, by referring to the topology data together as well, it is possible to estimate to pass over the Station B display device 1 in the course of moving from Station A to Station C.

With that, the trigger event at the Station A ticket gate and the content request event at the Station B display device 1 are set as a pair to generate an event interval of "320" to be used for content delivery from such data and the detailed data of the event intervals illustrated in FIG. 21.

After performing such process, the event interval calculation unit 113 judges whether or not there is an unprocessed user in the user list (step S55). When there is an unprocessed user, the process goes back to step S51. When there is no unprocessed user, the process is terminated.

Second Embodiment

In the first embodiment, there is still a case that processing load of the content manager 100 becomes a problem. With that, in the present embodiment, a part of functions of the content manager 100 is given to the event collection and distribution device 200.

Figure 23:
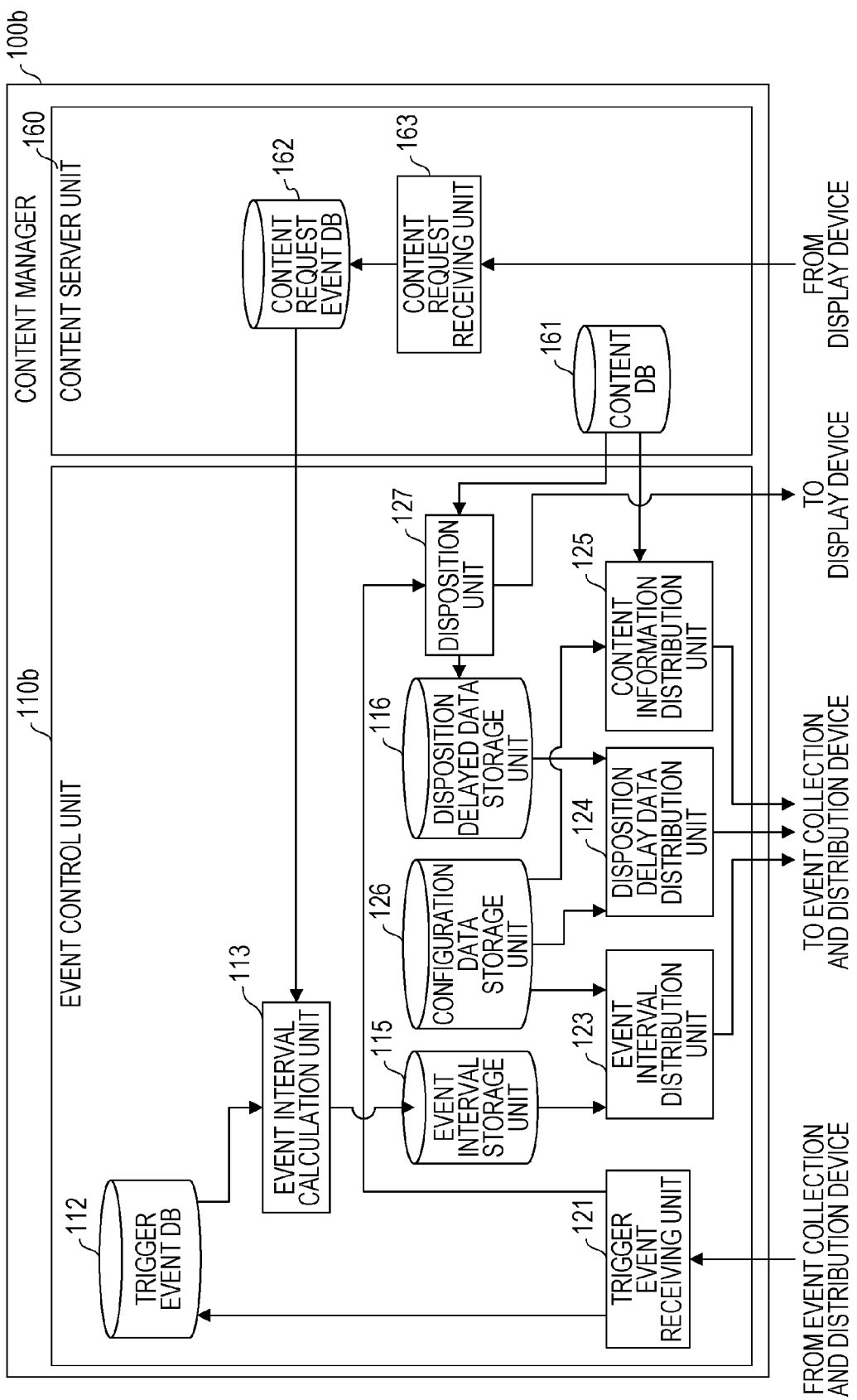
FIG. 23 is a functional block diagram of a content manager according to a second embodiment.

FIG. 23 illustrates a configuration of a content manager 100b according to the present embodiment. Same reference numerals are given to the components having same functions as in the first embodiment.

The content manager 100b according to the present embodiment has an event control unit 110b and the content server unit 160. Since the configuration of the content server unit 160 is similar to that in the first embodiment, the description is omitted.

The event control unit 110b has a trigger event receiving unit 121, the trigger event DB 112, the event interval calculation unit 113, the event interval storage unit 115, an event interval distribution unit 123, a disposition delay data distribution unit 124, a content information distribution unit 125, a configuration data storage unit 126, the disposition delayed data storage unit 116, and a disposition unit 127.

As the trigger event receiving unit 121 receives data of a trigger event from an event collection and distribution device 2200, it stores the data of a trigger event in the trigger event DB 112. In a case of receiving data of a trigger event including a content ID, the trigger event receiving unit 121 outputs the data of a trigger event also to the disposition unit 127.

The event interval distribution unit 123 distributes data that is stored in the event interval storage unit 115 to the event collection and distribution device 2200 according to the present embodiment based on data of the configuration data storage unit 126. The disposition delay data distribution unit 124 distributes data that is stored in the disposition delayed data storage unit 116 to the event collection and distribution device 2200 based on the data of the configuration data storage unit 126. The content information distribution unit 125 distributes data that is stored in the content DB 161 to the event collection and distribution device 2200 based on the data of the configuration data storage unit 126.

As the disposition unit 127 receives the data of a trigger event from the trigger event receiving unit 121, it disposes content data that is stored in the content DB 161 to the disposition destination device.

In the configuration data storage unit 126, sensor IDs of subordinate position sensors are registered for each event collection and distribution device 2200 included in the system.

Figure 24:
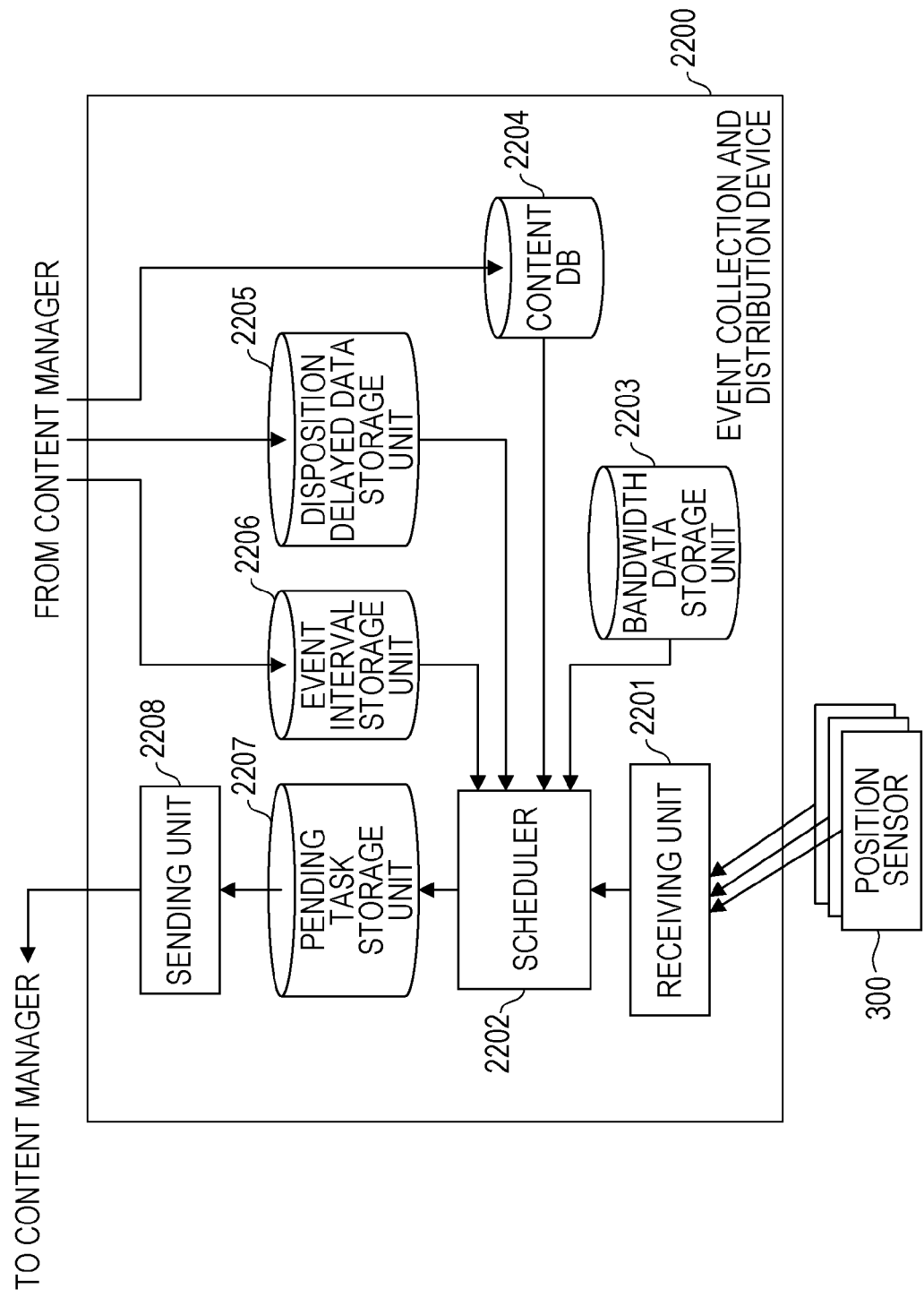
FIG. 24 is a functional block diagram of an event collection and distribution device according to the second embodiment.

The event collection and distribution device 2200 according to the present embodiment has a configuration as illustrated in FIG. 24. That is, the event collection and distribution device 2200 has a receiving unit 2201, a scheduler 2202, a bandwidth data storage unit 2203, a content DB 2204, a disposition delayed data storage unit 2205, an event interval storage unit 2206, a pending task storage unit 2207, and a sending unit 2208.

The bandwidth data storage unit 2203 holds similar data in a data format similar to that in the data stored in the bandwidth data storage unit 117. In the present embodiment, transmission delay between the event collection and distribution device 2200 and the content manager 100b is also considered, so that the bandwidth data storage unit 2203 also stores bandwidth data between the event collection and distribution device 2200 and the content manager 100b.

The content DB 2204 does not hold content data itself while holds data similar to that in the content DB 161. The event collection and distribution device 2200 receives a message that is sent from, for example, the content information distribution unit 125 (FIG. 25) and stores the data in the content DB 2204. In the example of FIG. 25, the message includes a header portion and a content information list for each user. The header portion includes a source address, such as a media access control (MAC) address or an IP address, and a destination address. The content information list for each user includes a combination of a user ID, a content ID, and a content size.

Further, the disposition delayed data storage unit 2205 has similar data in a data format similar to that in the disposition delayed data storage unit 116. The event collection and distribution device 2200 receives a message that is sent from, for example, the disposition delay data distribution unit 124 (FIG. 26) and stores the data in the disposition delayed data storage unit 2205. In the example of FIG. 26, the message includes a header portion and a disposition delay data list. The header portion includes a source address, such as a media access control (MAC) address or an IP address, and a destination address. The disposition delay data list includes a combination of a content ID, an identifier or an address of a disposition destination device of the content, and a delay time in a case of delivering the content data from the content manager 100b to the disposition destination device of the content. For each combination of the content ID and the identifier or the address of the disposition destination device of the content, a disposition delay data list is repeated.

The event interval storage unit 2206 stores similar data in a data format similar to that in the event interval storage unit 115. In the data to be stored, data on the subordinate position sensors 300 of the event collection and distribution device 2200 is included. In such a manner, only a portion of the event interval storage unit 115 is stored. For example, in a case of the example in FIG. 1, when using the event interval storage unit 2206 of the event collection and distribution device 2200 in Station A, data having the subordinate position sensor as the detected location (event occurrence location) is stored as illustrated in FIG. 27. When using the event interval storage unit 2206 of the event collection and distribution device 2200 in Station B, data having the subordinate position sensor as the detected location (event occurrence location) is stored as illustrated in FIG. 28.

The event collection and distribution device 2200 receives a message that is sent from, for example, the event interval distribution unit 123 (FIG. 29) and stores the data in the event interval storage unit 2206. In the example of FIG. 29, the message includes a header portion and an event interval list. The header portion includes a source address, such as a media access control (MAC) address or an IP address, and a destination address. The event interval list includes a user ID, an identifier (sensor ID) of an event occurrence location (position sensor), an identifier or an address of a disposition destination device of a content, and an event interval. For each combination of a user ID and an identifier of an event occurrence location, an event interval list is repeated.

The pending task storage unit 2207 holds data in a data format as illustrated in FIG. 30. In the example of FIG. 30, a sending starting clock time to start sending from the event collection and distribution device 2200, a sending destination address (here, the address of the content manager 100b), event data (a data main body of a trigger event), an address (or identifier) of a disposition destination device of a content, and a content ID of a content to be disposed are stored for each trigger event.

Figure 31:
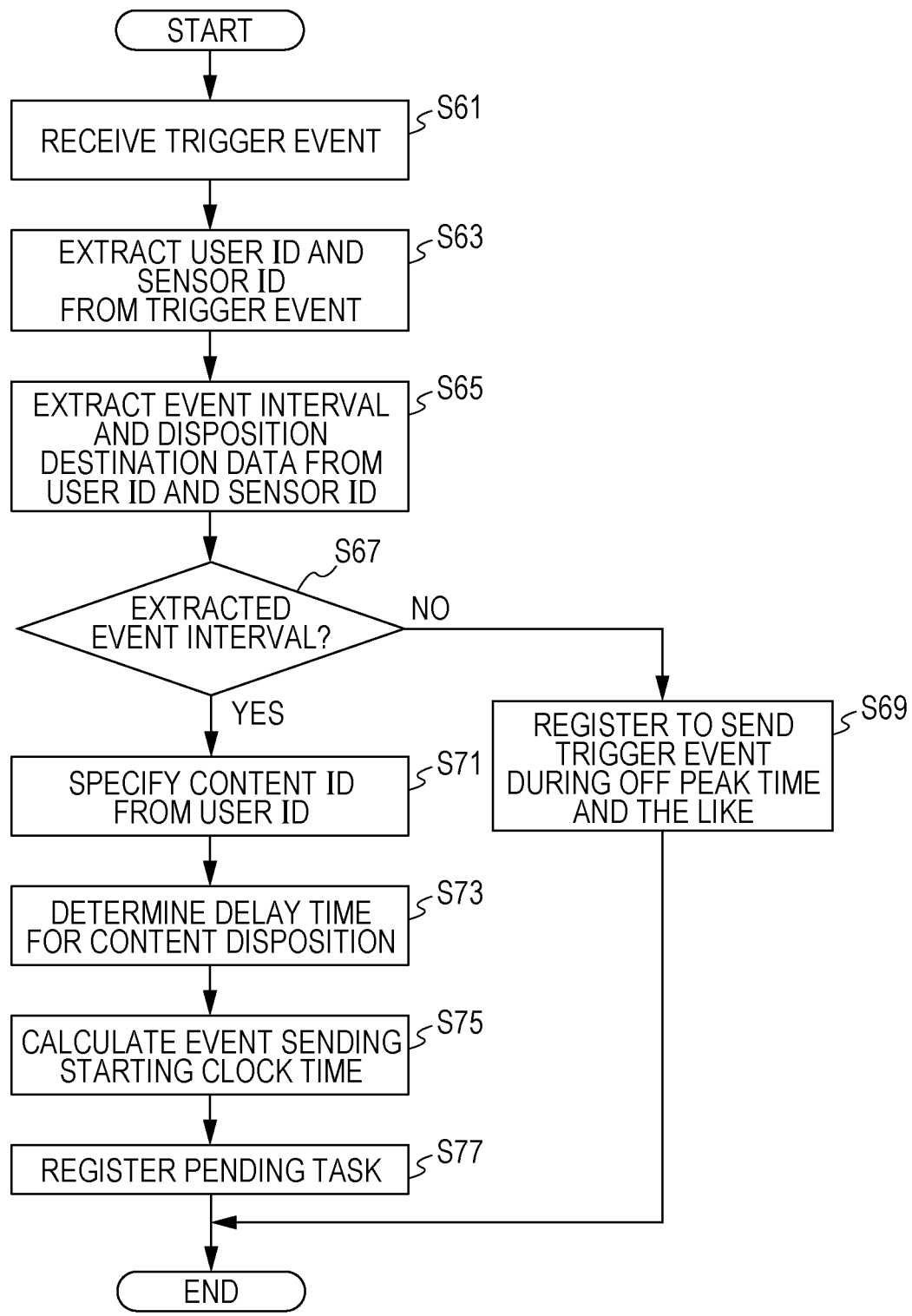
FIG. 31 is a chart illustrating a process flow of the event collection and distribution device according to the second embodiment.

Next, process details of the event collection and distribution device 2200 according to the present embodiment are described using FIG. 31.

In the present embodiment, as the receiving unit 2201 receives a trigger event (FIG. 7) from the position sensor 300, it outputs the trigger event directly to the scheduler 2202.

As the scheduler 2202 receives the trigger event from the receiving unit 2201 (step S61), it extracts a user ID and a sensor ID at the event occurrence location from the trigger event (step S63). Then, the scheduler 2202 extracts an event interval and an identifier of a disposition destination device of a content that are associated with the user ID and the sensor ID from the event interval storage unit 2206 (step S65).

Similar to the first embodiment, there is also a case that data, such as an event interval, is not stored in the event interval storage unit 2206 in association with the user ID and the sensor ID that are included in the trigger event.

The scheduler 2202 judges whether or not an event interval is successfully extracted in step S65 (step S67), and when the event interval is not successfully extracted (step S67: No route), the scheduler 2202 stores the data of the trigger event in the pending task storage unit 2207 to send the data to the content manager 100b during an off peak time and the like (step S69). For example, without registering a sending starting clock time, an address of a content disposition destination device, and a content ID, the scheduler 2202 stores the sending destination address (the address of the content manager 100b) and the data main body of the trigger event in the pending task storage unit 2207. In such a manner, it is assumed that the sending unit 2208 sends data of a trigger event having a sending starting clock time and the like that are not registered during a time, such as an off peak time. Then, the process is terminated.

In contrast, when an event interval is successfully extracted (step S67: Yes route), the scheduler 2202 specifies the content ID and the size that are associated with the user ID extracted from the trigger event from the content DB 2204 (step S71).

Then, the scheduler 2202 determines a delay time for content disposition (step S73). In the disposition delayed data storage unit 2205, as illustrated in FIG. 10, when a combination of the content ID and the identifier of the disposition destination device of the content are associated with a delay time, the delay time is read out. In contrast, in the disposition delayed data storage unit 2205, when a combination of the content ID and the identifier of the disposition destination device of the content are not associated with a delay time, bandwidth data that is associated with the identifier of the disposition destination device is read out from the bandwidth data storage unit 2203 to calculate a delay time by content size/bandwidth data.

Then, the scheduler 2202 calculates an event sending starting clock time (step S75). An event sending starting clock time $t_{send}$ according to the present embodiment is calculated by $t_0+[T_{evev}-{}^*t_{now}-t_0)-T_{deploy}-T_{evsnd}]$. $t_0$ denotes an event occurrence clock time that is included in a trigger event, $T_{evev}$ denotes an event interval, $t_{now}$ denotes a current clock time, and $T_{deploy}$ denotes a content disposition clock time. Further, in the present embodiment, transmission delay $T_{evsnd}$ of a message to send a trigger event between the event collection and distribution device 2200 and the content manager 100b is also taken into account, so that the bandwidth data, that is stored in the bandwidth data storage unit 2203, between the event collection and distribution device 2200 and the content manager 100b is read out and the transmission delay $T_{evsnd}$ is calculated by data size of a trigger event (may also be a fixed value)/bandwidth data.

After that, the scheduler 2202 generates a pending task including a sending starting clock time of an event, a sending destination address (the address of the content manager 100b), a data main body of a trigger event, an address of a disposition destination device of a content, a user ID, and a content ID to be registered in the pending task storage unit 2207 (step S77).

By performing such process, it becomes possible to dispose content data to a display device that is likely to be seen by a user before the user reaches the display device. On that occasion, in accordance with a length of time until the user moves to the display device that is likely to be seen by the user, priority is set as an event sending starting clock time to a task of sending a trigger event that directs disposition of content data. Accordingly, regardless of the order of trigger event occurrence, it becomes possible to start processing from a trigger event that has to have content data disposed earlier. In addition, process of a large amount of trigger events is not carried out by the content manager 100b, so that it becomes possible to reduce processing load of the content manager 100b.

Figure 32:
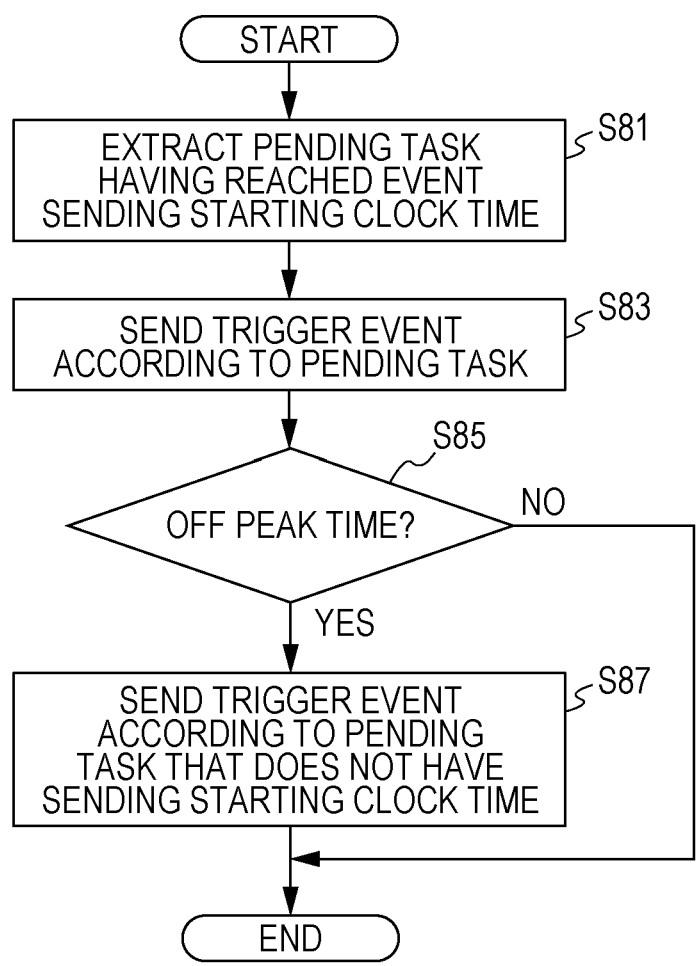
FIG. 32 is a chart illustrating a process flow of a sending unit in the event collection and distribution device.

Next, process details of the sending unit 2208 are described using FIG. 32. The sending unit 2208 extracts a pending task that has a current clock time as an event sending starting clock time from the pending task storage unit 2207 (step S81). Then, the sending unit 2208 sends a trigger event according to the extracted pending task as a message to the content manager 100b (step S83).

The message to be sent here is in a format as illustrated in, for example, FIG. 33. In the example of FIG. 33, the message includes a header portion and an event data portion. The header portion includes a source address, such as a media access control (MAC) address or an IP address, and a destination address. The event data portion includes an event occurrence clock time that is included in a data main body of a trigger event, an identifier (sensor ID) at an event occurrence location that is included in the data main body of the trigger event, a user ID that is included in the data main body of the trigger event, an address (or an identifier) of a disposition destination device of a content, and a content ID.

Then, the sending unit 2208 judges whether or not it is currently an off peak time or the like that is set in advance (step S85). When it is currently not the off peak time or the like that is set in advance, the process is terminated. In contrast, when it is currently the off peak time or the like that is set in advance, the sending unit 2208 sends a trigger event according to a pending task that does not have an event sending starting clock time registered in the pending task storage unit 2207 to the content manager 100b (step S87). Then, the process is terminated.

While the message in step S87 is also in a format as illustrated in FIG. 33, the address of the disposition destination device of the content in the event data portion and the content ID are not included.

By performing such process, it becomes possible to send a trigger event to the content manager 100b at an appropriate timing. In addition, it also becomes possible to send a trigger event that does not have a specified content ID during an off peak time or the like to the content manager 100b as the data to calculate an event interval.

Figure 34:
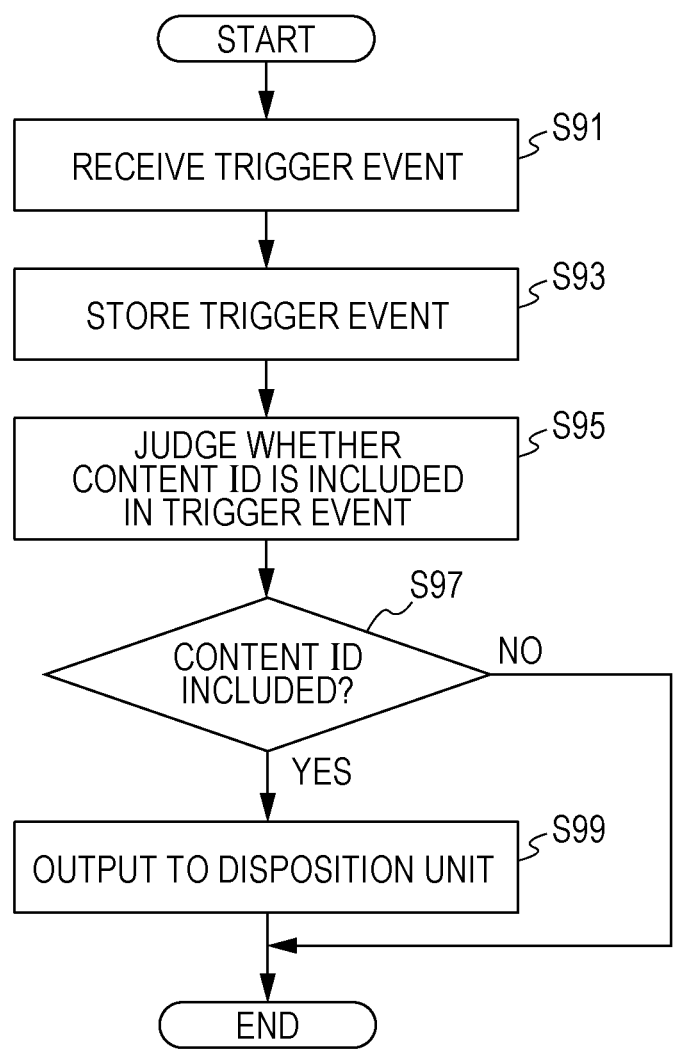
FIG. 34 is a chart illustrating a process flow of a trigger event receiving unit according to the second embodiment.

Next, using FIG. 34, process details of the trigger event receiving unit 121 of the event control unit 110b in the content manager 100b are described.

As the trigger event receiving unit 121 receives a message of a trigger event (FIG. 33) from the event collection and distribution device 2200 (step S91), it stores data of the trigger event in the trigger event DB 112 (step S93). As also described above, the data of the trigger event is stored in the data format as illustrated in FIG. 8.

The trigger event receiving unit 121 also judges whether or not a content ID is included in the message of the trigger event thus received (step S95).

When a content ID is not included in the message of the trigger event (step S97: No route), it turns out to receive a trigger event that does not have content data disposed therein, so that the process is terminated. In contrast, when a content ID is included in the message of the trigger event (step S97:

Yes route), the trigger event receiving unit 121 outputs the message data of the trigger event thus received (for example, the event data portion) to the disposition unit 127 (step S99). Then, the process is terminated.

In such a manner, similar to the first embodiment, it becomes possible to accumulate data to calculate an event interval.

Figure 35:
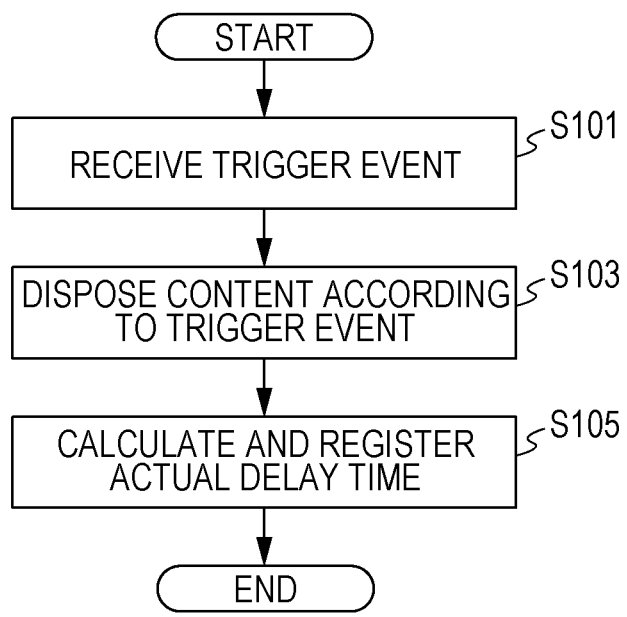
FIG. 35 is a chart illustrating a process flow of a disposition unit according to the second embodiment.

Further, the disposition unit 127 performs process as illustrated in FIG. 35. As the disposition unit 127 receives message data of a trigger event from the trigger event receiving unit 121 (step S101), it reads out a content of a content ID that is included in the message data of the trigger event from the content DB 161 and sends a message including content data as illustrated in FIG. 13 and a user ID that is included in the message data of the trigger event to the disposition destination device address that is included in the message data of the trigger event (step S103). On this occasion, a content ID, a disposition destination device address, and a sending clock time are held.

Then, as receiving an ACK message that includes a receiving clock time of a content from the disposition destination device, the disposition unit 127 calculates an actual delay time by (receiving clock time)–(sending clock time) and stores the actual delay time in the disposition delayed data storage unit 116 in association with the content ID and the disposition destination device address (step S105). The process may also be provisional registration, not regular registration, in order to calculate an average value and the like.

By performing such process, it becomes possible to correct details of the disposition delayed data storage unit 116 in agreement with the actual situation.

Figure 36:
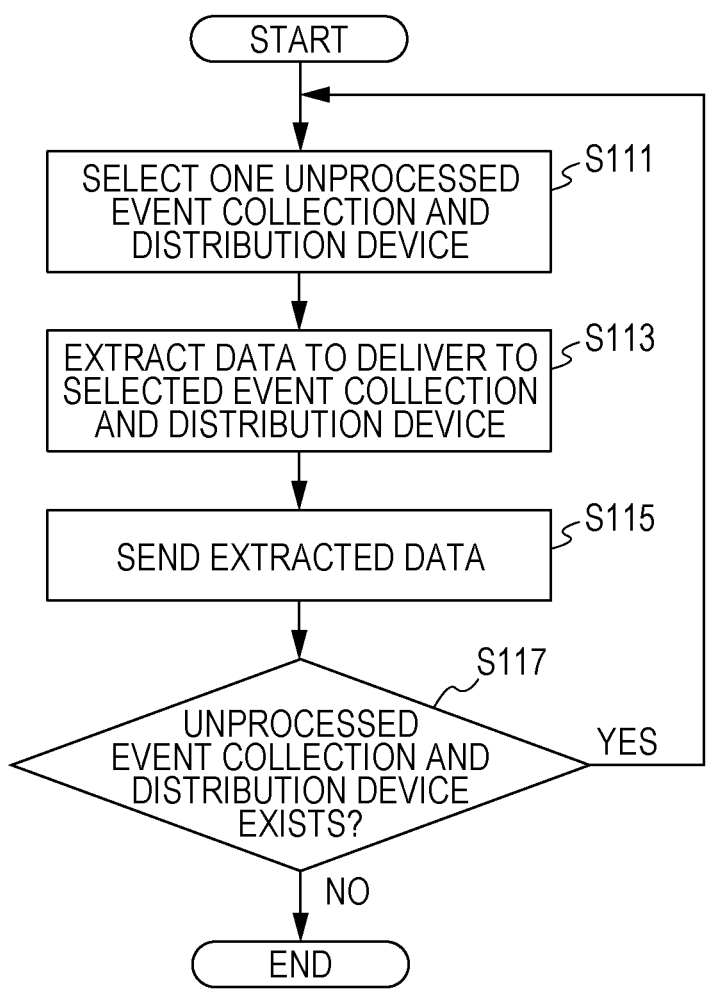
FIG. 36 is a chart illustrating a process flow of the distribution units according to the second embodiment.

Next, process details of the event interval distribution unit 123, the disposition delay data distribution unit 124, and the content information distribution unit 125 are described using FIG. 36.

These distribution units select one unprocessed event collection and distribution device 2200 out of the event collection and distribution devices 2200 that are registered in the configuration data storage unit 126 (step S111). Then, these distribution units extract data to be delivered to the selected event collection and distribution device 2200 from the event interval storage unit 115, the disposition delayed data storage unit 116, or the content DB 161 (step S113). The data to be extracted from the event interval storage unit 115 is data on the position sensors that are registered as subordinates of the selected event collection and distribution device 2200 in the configuration data storage unit 126. Data to be extracted from other storage units is basically all and it is also possible to narrow down to the data that is associated with a user ID of a user that frequently uses the subordinate position sensor of the selected event collection and distribution device 2200, for example. Further, while it turns out to distribute all data firstly, it is also possible to limit only to an updated part after that.

Then, these distribution units send the extracted data to the event collection and distribution device 2200 thus selected (step S115). After that, these distribution units judge whether or not there is an unprocessed event collection and distribution device 2200 (step S117). When there is an unprocessed event collection and distribution device 2200, the process goes back to step S111. In contrast, in a case of that there is no unprocessed event collection and distribution device 2200, the process is terminated.

By performing process as above regularly, for example, it is enabled to perform appropriate process in each event collection and distribution device 2200.

Third Embodiment

When the performance of the content manager 100b is low, it is considered to reduce processing load of the content manager 100b by reducing the number of messages of trigger events to be sent from the event collection and distribution device 2200. However, when all trigger events that do not relate to content disposition are discarded, there is a possibility of not functioning event interval learning and not effectively operating content prior disposition. For this reason, process of discarding a part of trigger events in accordance with the load of the content manager 100b is performed in the event collection and distribution device 2200. For a trigger event subjected to discard, any method may be employed in accordance with service providing specification, such as by randomly selecting and by selecting an event of a user other than the user subjected to learning.

Figure 37:
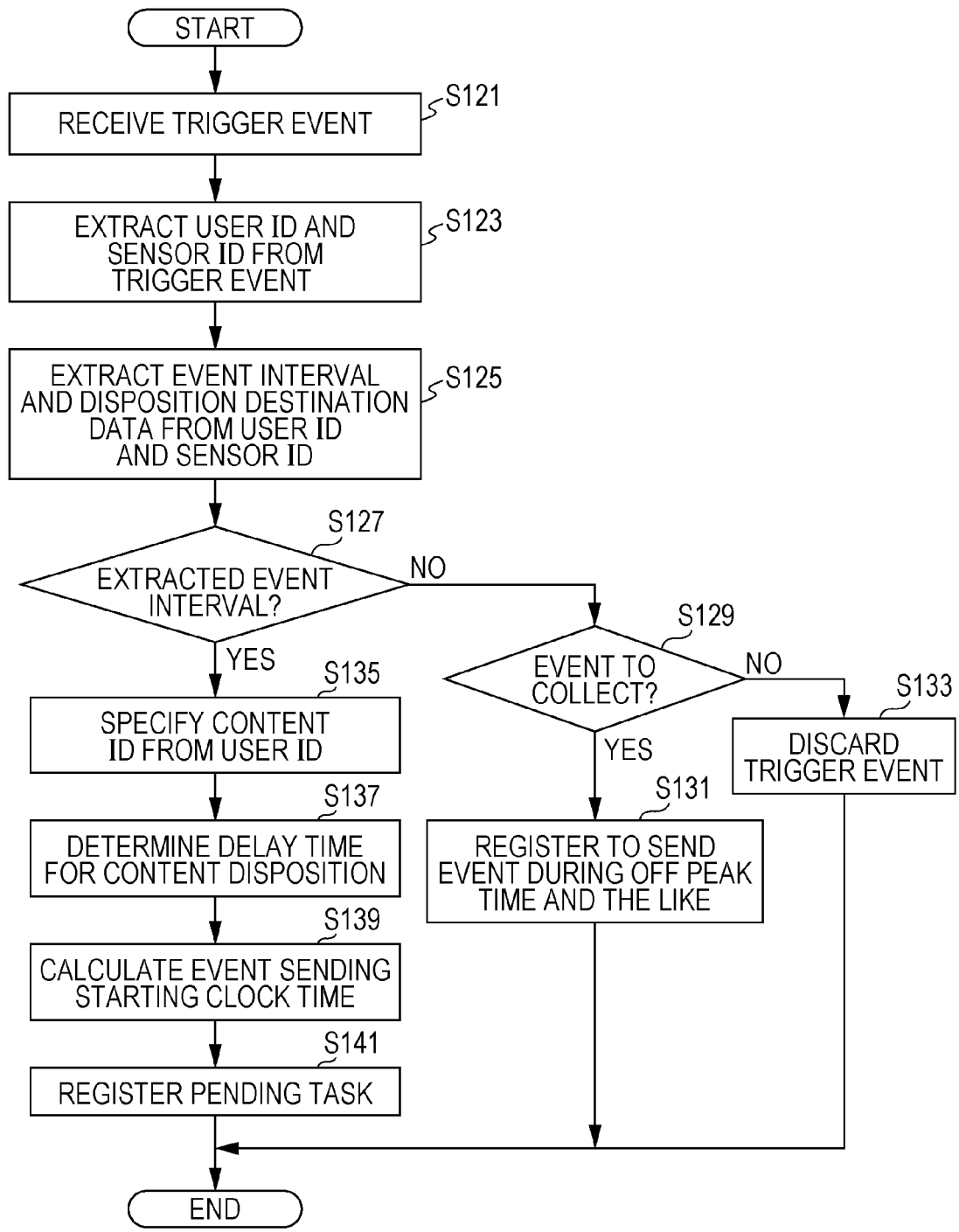
FIG. 37 is a chart illustrating a process flow of a scheduler according to a third embodiment.

That is, process of the scheduler 2202 (FIG. 31) is modified to a process flow in FIG. 37.

As the scheduler 2202 receives a trigger event from the receiving unit 2201 (step S121), it extracts a user ID and a sensor ID at an event occurrence location from the trigger event (step S123). Then, the scheduler 2202 extracts an event interval and an identifier of a disposition destination device of a content that are associated with the user ID and the sensor ID from the event interval storage unit 2206 (step S125).

Similar to the first embodiment, there is also a case that data, such as an event interval, is not stored in the event interval storage unit 2206 in association with the user ID and the sensor ID that are included in the trigger event.

The scheduler 2202 judges whether or not an event interval is successfully extracted in step S125 (step S127), and when the event interval is not successfully extracted (step S127: No route), the scheduler 2202 judges whether it is a trigger event to be collected or it is a timing to collect (step S129). When it is a trigger event to be collected or it is a timing to collect, the scheduler 2202 stores the data of the trigger event in the pending task storage unit 2207 so as to send the data to the content manager 100b during an off peak time and the like (step S131). For example, without registering a sending starting clock time, an address of a content disposition destination device, and a content ID, a sending destination address (the address of the content manager 100b) and a data main body of the trigger event are stored in the pending task storage unit 2207. In such a manner, it is assumed that the sending unit 2208 sends data of the trigger event in which a sending starting clock time and the like are not registered during a time, such as an off peak time. Then, the process is terminated.

In contrast, when it is neither a trigger event to be collected nor a timing to collect, the scheduler 2202 discards this trigger event (step S133). Then, the process is terminated.

When an event interval is successfully extracted (step S127: Yes route), the scheduler 2202 specifies the content ID and the size that are associated with the user ID extracted from the trigger event from the content DB 2204 (step S135).

Then, the scheduler 2202 determines a delay time for content disposition (step S137). In the disposition delayed data storage unit 2205, when a combination of a content ID and an identifier of a disposition destination device of a content is associated with a delay time as illustrated in FIG. 10, the delay time is read out. In contrast, in the disposition delayed data storage unit 2205, when a combination of a content ID and an identifier of a disposition destination device of a content is not associated with a delay time, bandwidth data that is associated with the identifier of the disposition destination device is read out from the bandwidth data storage unit 2203 to calculate a delay time by content size/bandwidth data.

Then, the scheduler 2202 calculates an event sending starting clock time (step S139). An event sending starting clock time $t_{send}$ according to the present embodiment is calculated by $t_0+[T_{evev}-(t_{now}-t_0)-T_{deploy}-T_{evsnd}]$. $t_0$ denotes an event occurrence clock time that is included in a trigger event, $T_{evev}$ denotes an event interval, $t_{now}$ denotes a current clock time, and $T_{deploy}$ denotes a content disposition clock time. Further, in the present embodiment, transmission delay $T_{evsnd}$ of a message to send a trigger event between the event collection and distribution device 2200 and the content manager 100b is also taken into account, so that bandwidth data, that is stored in the bandwidth data storage unit 2203, between the event collection and distribution device 2200 and the content manager 100b is read out to calculate transmission delay $T_{evsnd}$ by data size of a trigger event/bandwidth data.

After that, the scheduler 2202 generates a pending task including a sending starting clock time of an event, a sending destination address (the address of the content manager 100b), a data main body of a trigger event, an address of a disposition destination device of a content, a user ID, and a content ID to be registered in the pending task storage unit 2207 (step S141).

By performing such process, it becomes possible to decrease processing load of the content manager 100b.

While embodiments have been described above, the present technique is not limited to this. For example, the functional block diagrams described above are examples and there is also a case that they do not agree with actual program module configurations. There is also a case that data holding modes do not agree with actual file configurations. Further, regarding process flows, there is also a case that the process orders are allowed to be replaced or the processes are allowed to be executed in parallel as long as the process results do not change.

In addition, while the first embodiment does not represent an example of introducing process to discard a trigger event, the trigger event receiving unit 121 may also select a trigger event to be registered in the trigger event DB 112.

Still in addition, while examples that are assumed to be performed in stations above, they may also be performed in, for example, department buildings and the like. For example, it is also applicable to such an embodiment in which a card is placed over at a first floor entrance for reading of the user ID and also the card is placed over a display device on each floor for reading of the user ID. Further, it is also possible to be performed in a theme park and the like. When there are position sensors to generate a trigger event only in approximately one area, there is also a case of not using sensor IDs.

Further, the content managers 100 and 100b may be performed with one computer or may also be performed with a plurality of computers. The illustrated network configuration is one example and another network configuration may also be employed.

In a case of using the cache server 500, it is also possible to omit delivery of content data that is already cached by communication between the cache server 500 and the content manager 100 or 100b.

Figure 38:
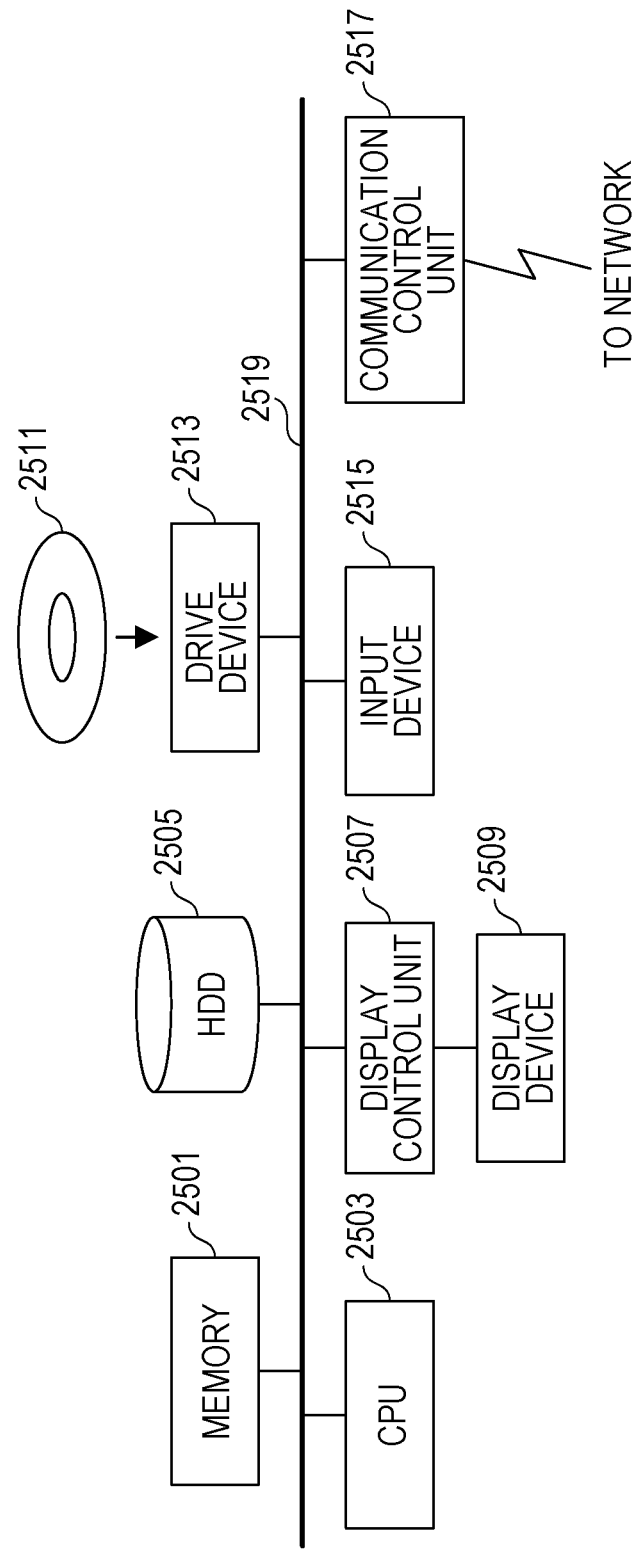
FIG. 38 is a functional block diagram of a computer.

The content managers 100 and 100b described above are computer devices, and as illustrated in FIG. 38, a memory 2501, a central processing unit (CPU) 2503, a hard disk drive (HDD) 2505, a display control unit 2507 that is connected to a display device 2509, a drive device 2513 for a removable disk 2511, an input device 2515, and a communication control unit 2517 that is connected to a network are connected by a bus 2519. An operating system (OS) and an application program to perform process in the present embodiments are stored in the HDD 2505, and when executed by the CPU 2503, they are read out from the HDD 2505 to the memory 2501. The CPU 2503 controls the display control unit 2507, the communication control unit 2517, and the drive device 2513 in accordance with process details of the application program to carry out a predetermined operation. Data in processing is stored mainly in the memory 2501 while it may also be stored in the HDD 2505. In embodiments of the present technique, the application program to perform the process described above is stored in the computer readable removable disk 2511 for distribution and is installed from the drive device 2513 to the HDD 2505. There is also a case of being installed to the HDD 2505 through a network, such as the internet, and the communication control unit 2517. Such computer device achieves various functions as described above by organic cooperation of hardware, such as the CPU 2503 and the memory 2501 described above, and programs, such as an OS and an application program.

The present embodiments described above are put together as follows.

An information processing method according to a first mode of the present embodiment includes: (A) when event data including a user identifier read by a sensor is received, specifying an identifier of a content that is associated with the user identifier, an identifier of a device at a delivery destination of the content, and time until data of the content is delivered to the device at the delivery destination; (B) from the specified time, calculating a clock time to start content sending to the device at the delivery destination of the content or a clock time to start data sending to a device that carries out the content sending; (C) storing the specified identifier of the content, the identifier of the device at the delivery destination of the content, and the calculated clock time in a data storage unit in association; and (D) as it becomes at a clock time that is stored in the data storage unit, sending data of a content corresponding to the identifier of the content that is associated with the clock time to the device at the delivery destination of the content corresponding to the identifier of the device at the delivery destination of the content that is associated with the clock time or sending the identifier of the content that is associated with the clock time and the identifier of the device at the delivery destination of the content to the device that carries out the content sending.

In such a manner, it becomes possible to output a content in accordance with a user by a display device in accordance with the user at a timing in accordance with the user. In addition, a content is output at a timing in accordance with the user, so that there is also a case of enabling load equalization of the devices that carry out content sending.

In addition, in the calculating described above, the clock time to start content sending to the device at the delivery destination of the content may also be calculated from a time obtained by deducting a difference between a current clock time and a clock time that the sensor reads the user identifier included in the event data and a time taken for content sending from the device that carries out the content sending to the device at the delivery destination of the content from the specified time, or the clock time to start data sending to the device that carries out the content sending may also be calculated from a time obtained by deducting the difference between the current clock time and the clock time that the sensor reads the user identifier included in the event data, the time taken for the content sending from the device that carries out the content sending to the device at the delivery destination of the content, and a time taken for the data sending to the device that carries out the content sending from the specified time.

In such a manner, it becomes possible to perform content sending or data sending at an appropriate clock time.

In addition, when the computer to execute the process described above is a computer to carry out the data sending to the device that carries out the content sending, the specifying described above may also include, when the identifier of the content that is associated with the user identifier is not specified, temporarily holding the event data to be sent to the device that carries out the content sending later. In such a manner, it becomes possible for the device to carry out content sending to obtain data used for calculation of an event interval and the like in, for example, a time range of off peak process amount and the like.

Still in addition, when the computer to execute the process described above is a computer to carry out the data sending to the device that carries out the content sending, the specifying described above may also include, when the identifier of the content that is associated with the user identifier is not specified, switching between temporarily holding the event data including the user identifier to be sent to the device that carries out the content sending later and discarding the event data including the user identifier.

By switching in accordance with an application, a load situation, and the like, it becomes possible to keep processing load to carry out content sending in an appropriate condition.

Further, there is also a case that the event data described above includes an identifier of the sensor. In this case, there is also a case that the identifier of the sensor and the user identifier are associated with the identifier of the device at the delivery destination of the content and time until the data of the content is delivered to the device at the delivery destination. For example, it becomes possible to be applied to a case that there are a plurality of entrances.

It is possible to create a program that causes a computer to perform the process as described above, and the program is stored in a computer readable storage medium or storage device, such as a flexible disk, an optical disk like a CD-ROM, a magneto-optical disk, a semiconductor memory (for example, a ROM), and a hard disk.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A method of content delivery executed by a computer, the method comprising:
specifying, when event data including a user identifier read by one of a plurality of sensors is received, an identifier of a content associated with an user identifier, an identifier of a device at a delivery destination of the content, and a period of time of the one of a plurality of sensors, the period of time being specified from among periods of time, each of which is associated with one of the plurality of sensors and the delivery destination;
calculating, from the specified period of time, a clock time to start content sending to the device at the delivery destination of the content or a clock time to start data sending to a device that carries out the content sending;
storing the specified identifier of the content, the identifier of the device at the delivery destination of the content, and the calculated clock time in a data storage unit in association; and
sending, at a clock time that is stored in the data storage unit, data of a content corresponding to the identifier of the content associated with the clock time to the device at the delivery destination of the content corresponding to the identifier of the device at delivery destination of the content associated with the clock time, or sending the identifier of the content associated with the clock time and the identifier of the device at the delivery destination of the content to the device that carries out the content sending.

2. The method according to claim 1, wherein in the calculating,
the clock time to start content sending to the device at the delivery destination of the content is calculated from a time obtained by deducting a difference between a current clock time and a clock time that the sensor reads the user identifier included in the event data and a time taken for content sending from the device that carries out the content sending to the device at the delivery destination of the content from the specified time, or
the clock time to start data sending to the device that carries out the content sending is calculated from a time obtained by deducting the difference between the current clock time and the clock time that the sensor reads the user identifier included in the event data, the time taken for the content sending from the device that carries out the content sending to the device at the delivery destination of the content, and a time taken for the data sending to the device that carries out the content sending from the specified time.

3. The method according to claim 1, wherein the computer executes the data sending to the device that carries out the content sending, and in the specifying, when the identifier of the content associated with the user identifier is not specified, temporarily holds the event data to be sent to the device that carries out the content sending later.

4. The method according to claim 1, wherein the computer executes the data sending to the device that carries out the content sending, and in the specifying, when the identifier of the content associated with the user identifier is not specified, switches between temporarily holding the event data including the user identifier to be sent to the device that carries out the content sending later and discarding the event data including the user identifier.

5. The method according to claim 1, wherein the event data includes an identifier of the sensor, and the identifier of the sensor and the user identifier are associated with the identifier of the device at the delivery destination of the content and time until the data of the content is delivered to the device at the delivery destination.

6. The method according to claim 1, wherein
the specifying further specifies a time taken for sending the content to the device at the delivery destination, and
the calculating the clock time is calculated from the specified period of time and the specified time taken for sending the content to the device at the delivery destination.

7. The method according to claim 1, wherein
the delivery destination is specified from among a plurality of delivery destinations, and each of the periods of time is defined in association with each of the plurality of sensors and corresponding delivery destination among the plurality of delivery destinations.

8. The method according to claim 7, wherein
the delivery destination is specified from among the plurality of delivery destinations based on attribute information set for each pair of one of the plurality of sensors and one of the plurality of delivery destination, and
the calculation is performed with regard to the specified delivery destination.

9. An information processing device, comprising:
a data storage configured to store periods of time, each of which is associated with one of a plurality of sensors and delivery destination of a content; and
a processor configured to:
specify, when receiving event data including a user identifier read by one of the plurality of sensors, an identifier of the content associated with the user identifier and an identifier of a device at the delivery destination of the content, and a period of time of the one of a plurality of sensors, the period of time being specified from among period of times each of which is associated with one of the plurality of sensors and the delivery destination;
calculate, from the specified period of time, a clock time to start content sending to the device at the delivery destination of the content or a clock time to start data sending to a device that carries out the content sending from the specified time, and stores the specified identifier of the content, the identifier of the device at the delivery destination of the content, and the calculated clock time in the data storage unit in association; and
sends, at the clock time that is stored in the data storage unit, the data of the content corresponding to the identifier of the content associated with the clock time to the device at the delivery destination of the content corresponding to the identifier of the device at the delivery destination of the content associated with the clock time, or sends the identifier of the content associated with the clock time and the identifier of the device at the delivery destination of the content to the device that carries out the content sending.

10. An information processing system, comprising:
a plurality of sensors to read a user identifier of a user and to generate event data including the user identifier;
a first device to receive the event data from the plurality of sensors;
a second device to send data of a content corresponding to an identifier of the content when receiving the data including the identifier of the content associated with the user identifier from the first device; and
a plurality of third devices to store the data of the content that is sent from the second device; wherein
the first device includes a scheduler that specifies, when event data including a user identifier read by one of a plurality of sensors is received, the identifier of the content associated with the user identifier and an identifier of the third devices at delivery destination of the content, specifies a period of time of the one of a plurality of sensors, the period of time being specified from among periods of time, each of which is associated with one of the plurality of sensors and the delivery destination, calculates, from the specified period of time, a clock time to start data sending to the second device that carries out content sending to the third devices at the delivery destination of the content from the specified time, and stores the specified identifier of the content, the identifier of the third devices at the delivery destination of the content, and the calculated clock time in a data storage unit in association, and a sending unit that sends, at the clock time that is stored in the data storage unit, the identifier of the content that is associated with the clock time and the identifier of the third devices at the delivery destination of the content to the second device, and
the second device sends the data of the content corresponding to the identifier of the content that is received from the first device to the third devices corresponding to the identifier of the third devices at the delivery destination of the content that is received from the first device.

* * * * *